United States Patent [19]

Kobayashi

[11] Patent Number: 5,706,469
[45] Date of Patent: Jan. 6, 1998

[54] DATA PROCESSING SYSTEM CONTROLLING BUS ACCESS TO AN ARBITRARY SIZED MEMORY AREA

[75] Inventor: Souichi Kobayashi, Itami, Japan

[73] Assignee: Mitsubishi Denki Kabushiki Kaisha, Tokyo, Japan

[21] Appl. No.: 526,477

[22] Filed: Sep. 11, 1995

[30] Foreign Application Priority Data

Sep. 12, 1994 [JP] Japan .................. 6-217592

[51] Int. Cl.⁶ .................. G06F 13/00
[52] U.S. Cl. .................. 395/481; 395/485; 395/478; 395/496; 395/497.01; 395/490; 395/411; 395/420; 395/421.01; 395/287; 395/291; 395/294; 395/296; 395/301; 395/303; 395/309; 395/809; 395/879; 395/728; 395/564
[58] Field of Search .................. 395/291, 294, 395/296, 301, 303, 309, 310, 496, 478, 485, 497.01, 490, 411, 420, 421.01, 287, 481, 869, 879, 728, 564

[56] References Cited

U.S. PATENT DOCUMENTS 4,945,472 7/1990 Sakamura et al. .................. 395/381
5,300,811 4/1994 Suzuki et al. .................. 257/691

OTHER PUBLICATIONS

80960CA User's Manual, 1989, pp.10–12 and 10–13, Intel Corporation.

Primary Examiner—Tod R. Swann
Assistant Examiner—Denise Tran
Attorney, Agent, or Firm—Lowe, Price, LeBlanc & Becker

[57] ABSTRACT

A novel data processing system is disclosed. Least significant bits of an address of a to-be-accessed memory of a number corresponding to a minimum specified range of a plurality of to-be-controlled memory areas each specified in an arbitrary size in advance are masked by mask bits. The access address with a predetermined number of least significant bits thereof masked is compared with each head address of a plurality of the memory areas to be controlled. It is decided in which of the memory areas to be controlled the access address is included. The memory access is controlled by access control data set for each memory area to be controlled. Further, the plurality of memory areas to be controlled are arranged in the order of priority. The to-be-controlled memory areas of higher priority are removed from the whole of the memory areas, whereby discontinuous memory areas are treated as a single memory area to be controlled.

18 Claims, 19 Drawing Sheets

FIG. 17

|  | CORRESPOND-ING AREA | ADDRESS REGISTER | MASK REGISTER |
|---|---|---|---|
| ENTRY 0 | AREA 0 | D000 0009'H | F800 0000'H |
| ENTRY 1 | AREA 1 | 0000 0213'H | F000 0000'H |
| ENTRY 2 | AREA 2 | E000 0218'H | E000 0000'H |
| ENTRY 3 | AREA 3 | 0000 03F8'H | 0000 0000'H |

DATA PROCESSING SYSTEM CONTROLLING BUS ACCESS TO AN ARBITRARY SIZED MEMORY AREA

BACKGROUND OF THE INVENTION

1. Field of the Invention

The present invention relates to a data processing system for controlling bus access to a memory by means control data stored in a register.

2. Description of the Related Art

A data processing system using a microprocessor has been remarkably improved in performance with increasing operating frequencies. This has increased the frequency an external bus and shortened a bus cycle.

An access via a bus is initiated by the microprocessor asserting a strobe signal indicating the start of bus access. A memory controller receives an address and the strobe signal from the microprocessor, decodes the address signal, accesses a memory associated with the decoded dress, and returns an access completion signal to the microprocessor at a predetermined timing when completing the access. The particular access is hence finished. In cycle, the memory controller returns data read out from the memory to the microprocessor simultaneously with the access completion signal.

The time required for bus access is interpreted to be the sum of an address decode time by the memory controller and an access time to the memory. The microprocessor is required to move into a next operating condition after receiving the access completion signal. In many cases, therefore, a set-up time for the access completion signal is made larger than that for data. As a result, the sum of the address decode time and time to create the access completion signal is sometimes larger than the memory access time.

In view of this, it has been devised to install a register adapted to set data for controlling of bus access within the microprocessor in order to shorten the access time by eliminating the need of generating an access completion signal by an external memory controller.

FIG. 1 is a block diagram showing the configuration of a conventional data processing system including a bus controller disclosed in "80960CA User's Manual" (pp.10-12~10-13; Intel Corporation). In FIG. 1, reference numeral 1 designates a microprocessor including a bus controller 5 capable of controlling bus access without referring to an external input signal from a memory controller 2. The microprocessor 1 and a memory 3 are connected by a bus. The memory controller 2 which controls access to the memory 3 by feeding various external input signals to the microprocessor 1 is inserted between the microprocessor 1 and the memory 3.

FIG. 2 is a schematic diagram showing a memory area structure table having a memory map of the memory 3 and a memory area structure register. FIG. 3 is a diagram showing the bit assignment in the memory area structure register. With this data processing system, an address range valid on the memory can be set for each 256 MB obtained by dividing a 32-bit address space (4 GB) equally into 16 areas. As shown in FIG. 2, the whole address space is controlled by 16 tables with corresponding 16 memory area structure registers. The memory area structure registers, as shown in FIG. 3, are adapted to set therein access control data such as the number of waits of a bus access in units of 256 MB and data indicating whether a given memory area is to be transferred in a burst of a plurality of single transfers (burst transfer), etc.

Consequently, the memory controller 2 is not required to return the access completion signal to the microprocessor 1 or to investigate and inform the need of burst transfer to the microprocessor 1, thereby shortening the access time.

The conventional data processing system described above, however, cannot control bus access other than in large units of 256 MB via a bus access control register. In the case, for example, where a register is installed for each 4 KB to control as small an area as 4 KB, the number of registers involved is too large to eventually control the small area. The size of the memory area controlled by each register is disadvantageously set in advance fixedly. Further, a memory area astride a plurality of areas with discontinuous address cannot be controlled by a single register.

SUMMARY OF THE INVENTION

The invention has been developed to solve these problems, and the object thereof is to provide a data processing system capable of controlling bus access to a memory area of an arbitrary size with the use of a small number of registers.

Another object of the invention is to provide a data processing system where a memory area astride a plurality of areas with discontinuous addresses is controllable by a single register.

In the data processing system of the invention, a memory area of an arbitrary size with an arbitrary head address can be set as a memory area to be controlled for bus access. As a consequence, peripheral circuits of the memory are reduced, the speed of bus access is improved, and the memory space is used more efficiently. Enhanced performance is exerted at saved costs.

Moreover, in the data processing system according to this invention, it is possible to refer to a response signal from an external memory even when a memory area having control data set by the memory area address register is accessed. Accordingly, the control data of the memory area address register and the memory area mask address register can be used in combination with the response signal from the external memory, thus increasing a degree of freedom in the constitution of the system.

Further, the data processing system according to the present invention is, by validating only required bits while invalidating specific bits of the memory area address register, operable with referring merely to a signal corresponding to the invalidated bits among the response signals from the external memory. Therefore, the system can be constructed flexibly, e.g., in setting of the bus error area. Also, a hang-up is eliminated which otherwise might be caused by the access to a memory area without a memory, thereby improving the system reliability.

In the data processing system according to the invention, a signal indicating that the most significant bits in the to-be-accessed address which are not masked by the mask bits coincide with the most significant bits of the head address set in the memory area address register is output to the memory controller decoding the address as a signal for specifying the memory area to be accessed. Therefore, the most significant bits not masked by the mask bits of the address to be accessed are not required to be decoded by the memory controller, thereby reducing the number of circuit elements.

In carrying out our invention in another preferred mode, we utilize a data processing system comprising a plurality of sets of memory area address registers and memory area mask registers and the circuit for determining the order of priority of the registers. In the data processing system of the invention, a memory area overlapping with another memory area is set as a memory area to be accessed and the memory area control circuit equipped with the registers is set to be of lower priority than other memory area control circuits. As a result, a plurality of memory areas with discontinuous addresses separated by other memory areas can be designated by a single register, and the whole memory space can thus be designated by a small number of registers.

The above and other objects, features and advantages will be made apparent by the detailed description taken in conjunction with the accompanying drawings.

BRIEF DESCRIPTION OF THE DRAWINGS

FIG. 17 is a table showing set values of the four sets of memory area address registers and memory area mask registers in hexadecimal notation;

DESCRIPTION OF THE PREFERRED EMBODIMENTS

The invention will be described below with reference to the accompanying drawings showing embodiments.

Embodiment 1

Figure 1:
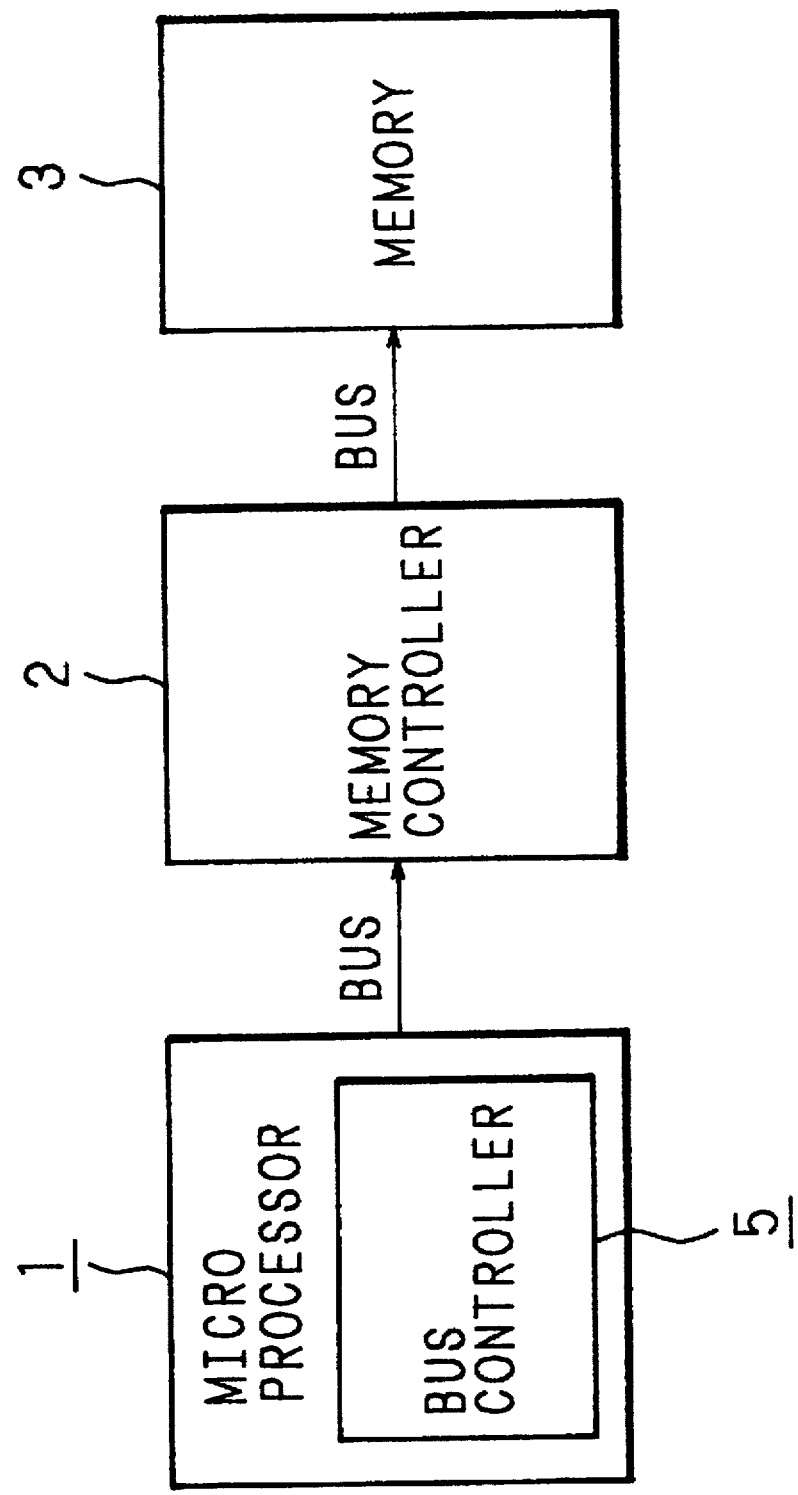
FIG. 1 is a block diagram showing the configuration of a conventional data processing system.
Figure 2:
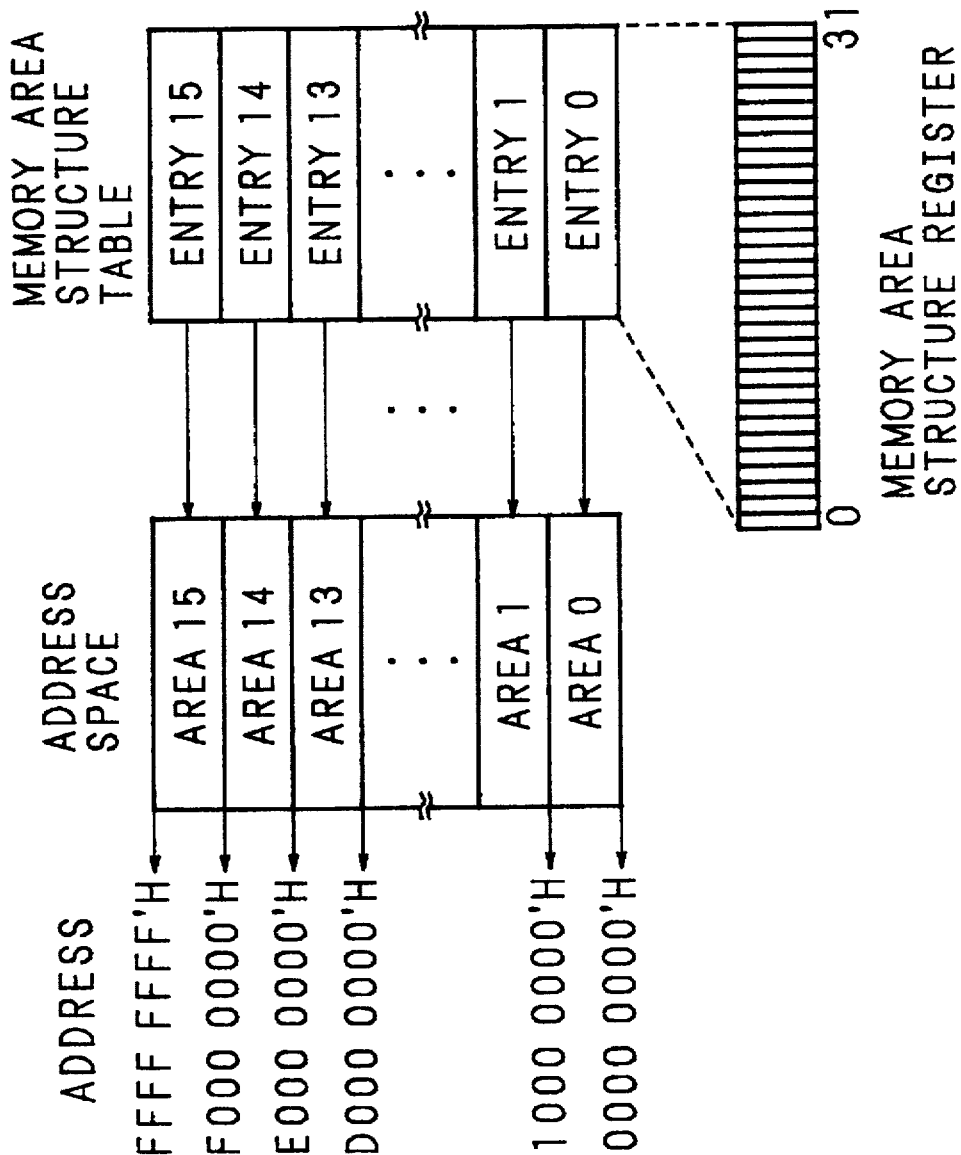
FIG. 2 is a memory map of an address space with a memory area structure table in the conventional data processing system.
Figure 3:
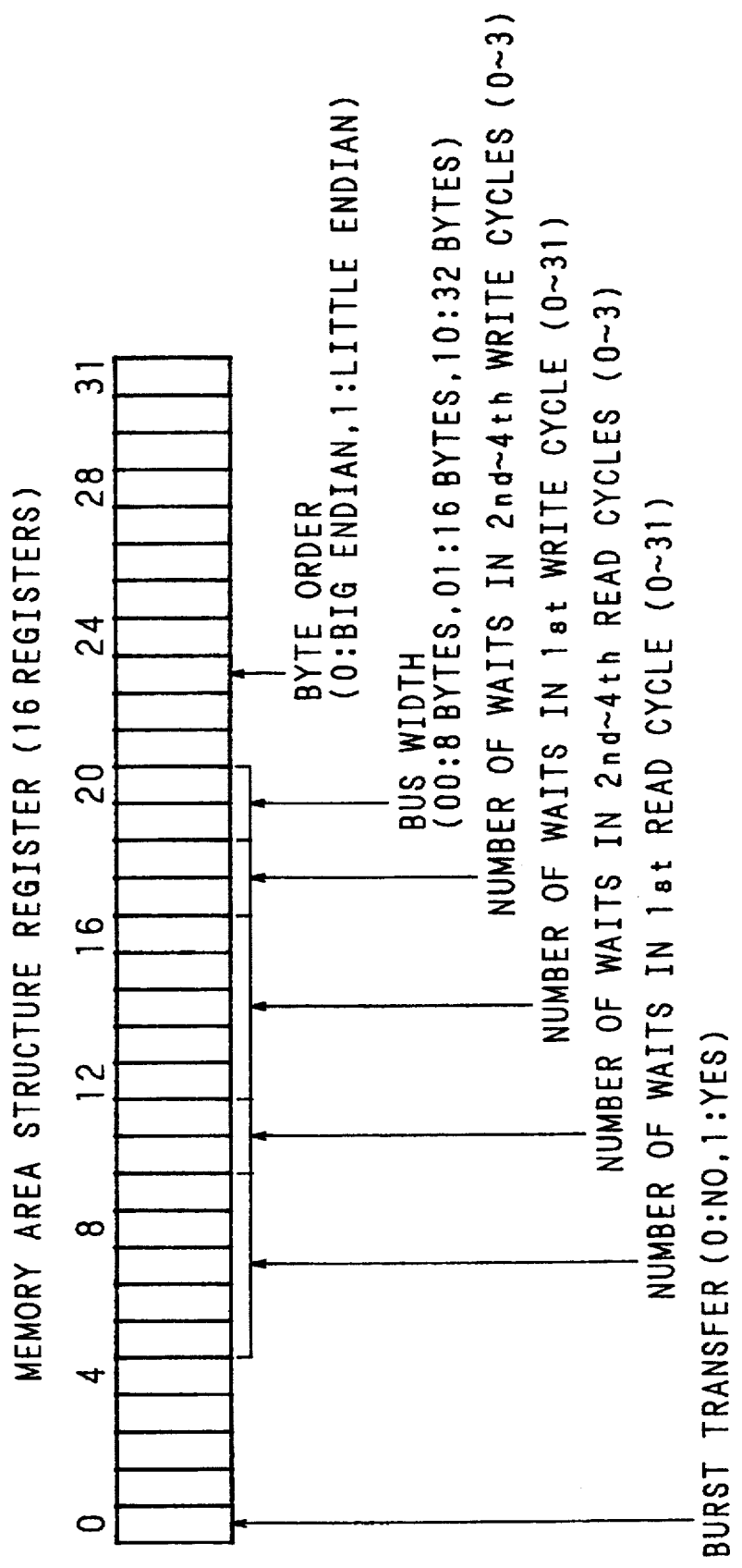
FIG. 3 is a diagram showing the bit assignment of each memory area structure register in the conventional data processing system.
Figure 4:
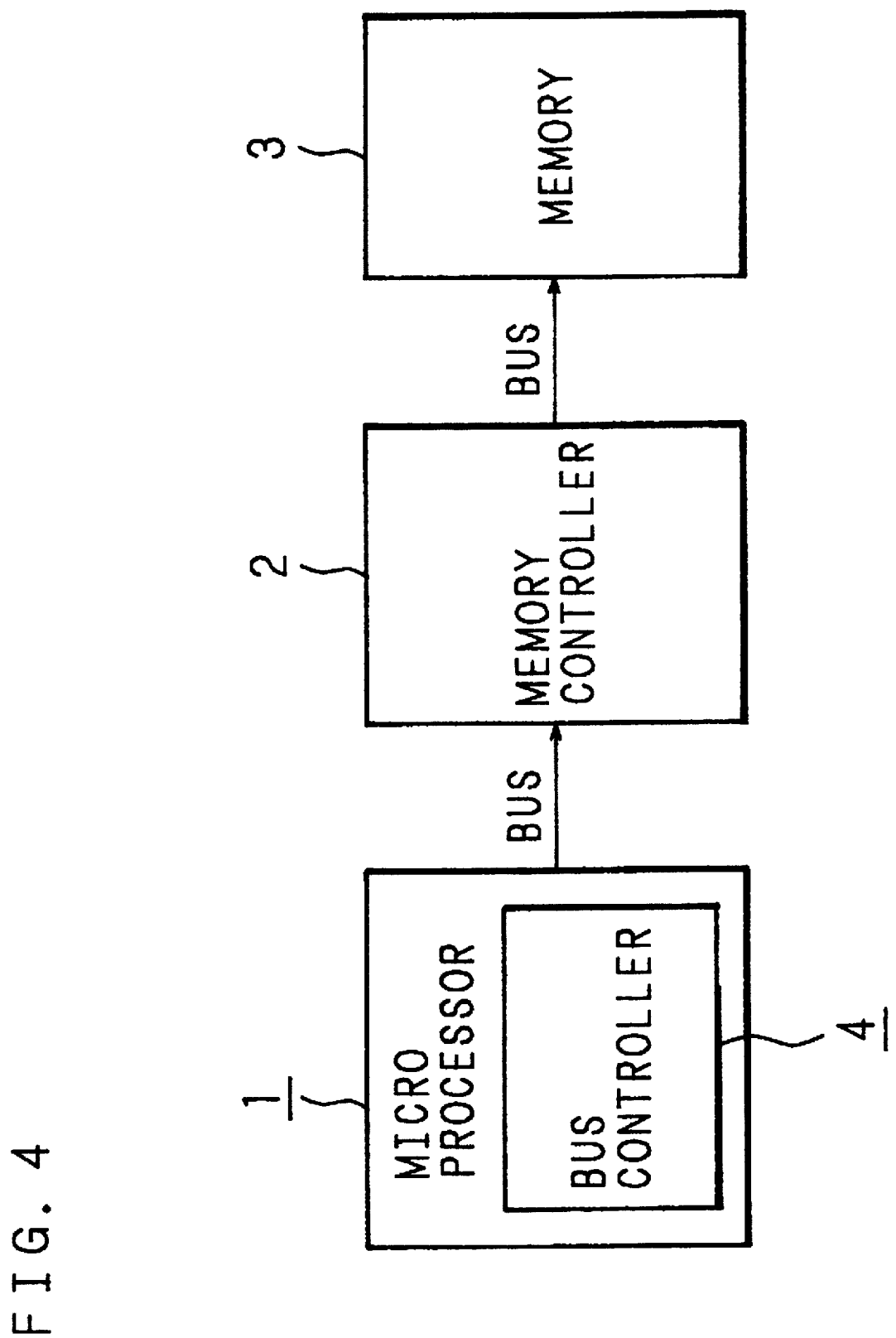
FIG. 4 is a block diagram showing the configuration of a data processing system according to the present invention.

FIG. 4 is a block diagram showing the configuration of a data processing system according to the invention. In FIG. 4, numeral 1 designates a microprocessor. The microprocessor 1 includes a bus controller 4 capable of controlling bus access without referring to an external input signal from a memory controller 2. The microprocessor 1 and a memory 3 are connected by a bus. The memory controller 2 for controlling access to the memory 3 by feeding various external input signals to be described later to the microprocessor 1 is interposed between the microprocessor 1 and the memory 3. The data processing system according to the invention has two modes, i.e., a single transfer mode for transferring data subsequent to a request for access to the memory and a burst transfer mode for transferring data of a given memory area in a burst of a plurality of single transfers. Various data set in the memory controller 2 in advance include such data as a cycle of the single transfer mode, a cycle of the burst transfer mode, the number of waits in the single cycle and that in the burst cycle, the presence or absence of a burst transfer, and data indicating whether an exception handling should be performed in the event of a bus error of making access to an inaccessible area, e.g., without a memory installed (data indicative of the presence or absence of a bus error).

Figure 5:
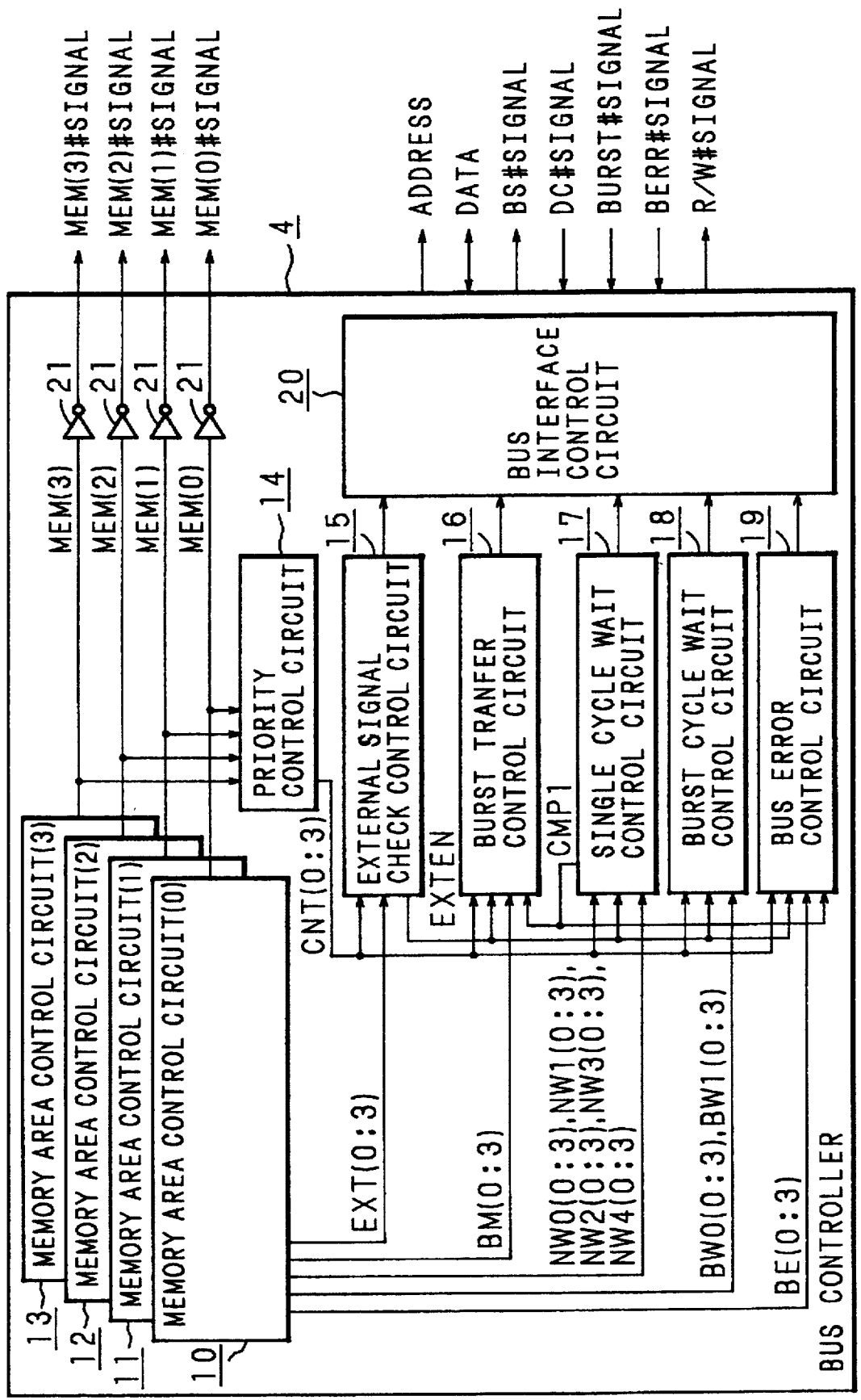
FIG. 5 is a block diagram showing a detailed structure of a bus controller shown in FIG. 4.

FIG. 5 is a circuit diagram showing the internal structure of the bus controller 4. Four memory area control circuits (0:3) 10 to 13 are in the same structure. Each control circuit has one set of a memory area mask register and a memory area address register (to be described in detail later) to set a to-be-controlled memory area of an arbitrary size. The memory area control circuits (0:3) 10 to 13 output MEM (0:3) signals to a priority control circuit 14 and MEM(0:3)# signals obtained by inverting the MEM (0:3) signals by an inverter 21 to the memory controller 2. The MEM signal becomes significant when an address to be accessed is included in the set memory area. Also, the memory area control circuits (0:3) 10 to 13 generate EXT(0:3) signals to an external input signal check control circuit 15 to switch the controller to a check mode to check the external input signal from the memory controller 2 at the time of bus access, BM(0:3) signals showing the presence or absence of a burst transfer to a burst transfer control circuit 16, NWO(0:3) to NW4(0:3) signals instructing the number of waits for the single transfer cycle (single cycle) to a single cycle wait control circuit 17, BWO(0:3) and BW1(0:3) signals indicating the number of waits for the burst transfer cycle (burst cycle) to a burst cycle wait control circuit 18, and BE(0:3) signals indicating whether or not the exception handling should be performed to a bus error when an inaccessible area is accessed to, to a bus error control circuit 19.

The priority control circuit 14 arranges the four memory area control circuits (0:3) 10 to 13 in order of priority, and selects one control circuit of the highest priority among the memory area control circuits (0:3) 10 to 13 having the target address included in the set memory areas thereof. A CNT (0:3) signal representing the result of the selection of one memory area control circuit is sent to the external input signal check control circuit 15, the burst transfer control circuit 16, the single cycle wait control circuit 17, the burst cycle wait control circuit 18 and the bus error control circuit 19.

The external input signal check control circuit 15 outputs, in accordance with the signal CNT(0:3) from the priority control circuit 14, the EXT signal from the memory area control circuit (0)10, (1)11, (2)12 or (S)13 selected by the priority control circuit 14 to the burst transfer control circuit 18, the single cycle wait control circuit 17, the burst cycle wait control circuit 18 and the bus error control circuit 19 as an EXTEN signal.

The single cycle wait control circuit 18 compares, in accordance with the CNT(0:3) signal from the priority control circuit 14, the NWO(0:3) to NW4(0:3) signals from the memory area control circuit (0)10, (1)11, (2)12 or (3)13 selected by the priority control circuit 14 with a value counted by a counter to be described later, and feeds a CMP1 signal representing the result of the comparison to the burst transfer control circuit 16 and the bus error control circuit 19.

To a bus interface control circuit 20 are supplied from the burst transfer control circuit 18 a signal generated inside the circuit 18 on the basis of the BM(0:3) signals from the memory area control circuits (0:3) 10 to 13 or a BURST# signal from the memory controller 2, as a burst mode signal; from the single cycle wait control circuit 17 a signal generated inside the circuit 17 on the basis of the NW(0:4) signals from the memory area control circuits (0:3) 10 to 13 or a DC# signal from the memory controller 2, as a single cycle DC signal; from the burst cycle wait control circuit 18 a signal generated in the circuit 18 on the basis of the BWO, BW1 signals from the memory area control circuits (0:3) 10 to 13 or the DC# signal from the memory controller 2, as a burst cycle DC signal; and from the bus error control circuit 19 a signal generated inside the circuit 19 on the basis of the BE(0:3) signals from the memory area control circuits (0:3) 10 to 13 or a BERR# signal from the memory controller 2, as a bus error signal, respectively.

The bus interface control circuit 20 supplies an address to be used for access to the memory 3 (and also write data at the write time), a BS# signal indicating the start of bus access and a R/W# signal indicating a transfer direction of data to the memory controller 2. On the other hand, the memory controller 2 feeds the circuit 20 external input signals, namely, read data (at the read time), the DC# signal (first external input signal) indicating the completion of each cycle of bus access, the BURST# signal (second external input signal) indicating whether a burst transfer is possible for the accessed memory area and the BERR# signal (third external input signal) indicating it impossible to access an area, for instance, without a memory, that is, occurrence of a bus error thereby to start the exception handling.

The signal with a symbol # attached to the tail thereof indicates a significant signal with 0'B ('B represents a binary notation).

Figure 6:
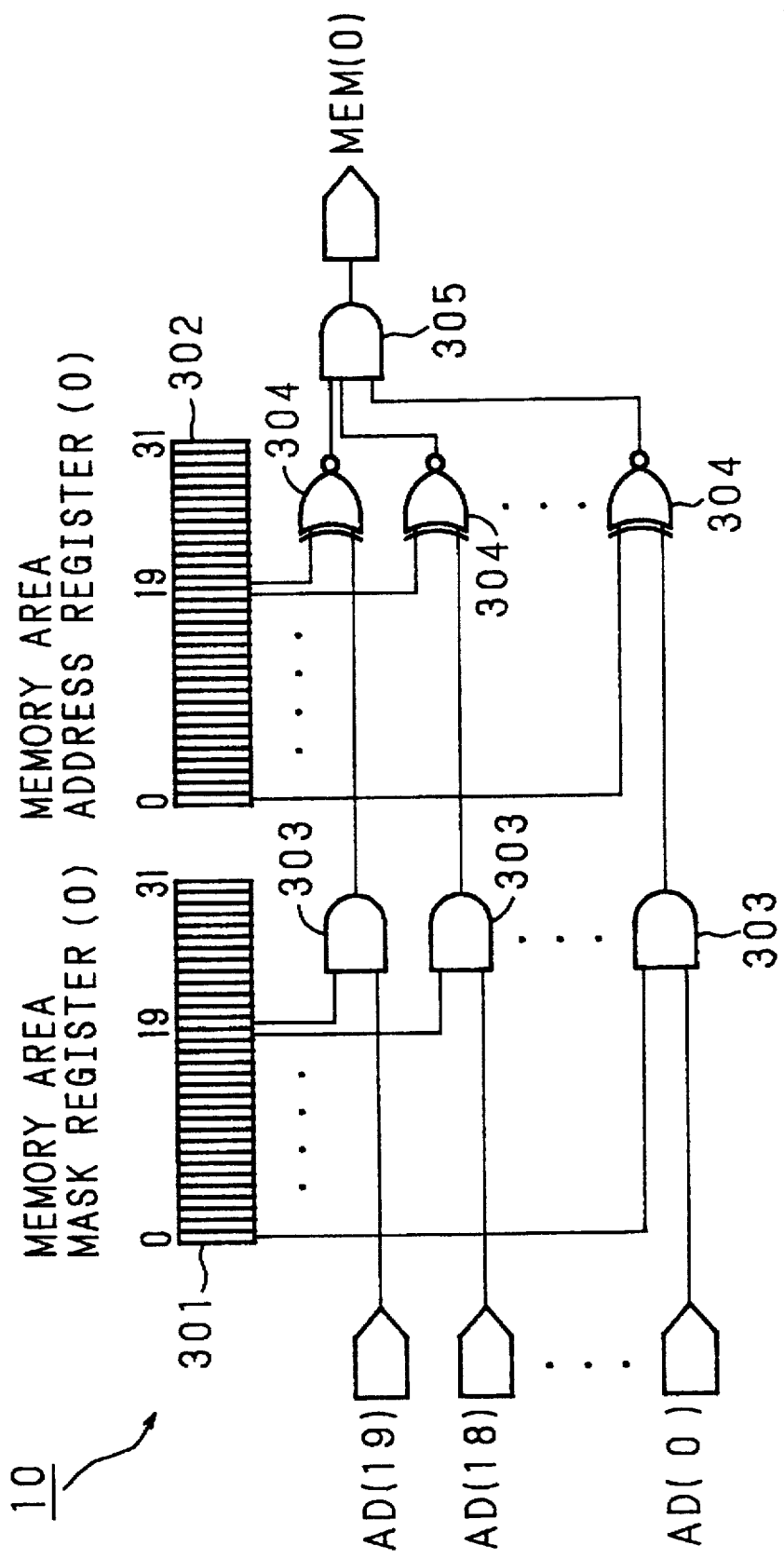
FIG. 6 is a structural circuit diagram of a memory area control circuit (0) of FIG. 5.

FIG. 6 is a circuit diagram showing the internal structure of the memory area control circuit (0) 10. The memory area control circuit (0) 10 includes a set of a memory area mask register (0) 301 and a memory area address register (0) 302, AND gates 303, 303, . . . (first gates) respectively having two inputs of the most significant 20 bits AD(0) to AD(19) of the target address and 0 to 19 bits of the memory area mask register (0) 301, EX-NOR gates 304, 304, . . . (second gates) having two inputs, namely, outputs from the AND gates 303, 303, . . . and 0 to 19 bits of the memory area address register (0) 302, and an AND gate 305 (third gate) to which outputs from the EX-NOR gates 304, 304, . . . are input and which generates the MEM(0) signal indicating whether or not all the outputs of the EX-NOR gates 304, 304, . . . coincide with each other.

Figure 7:
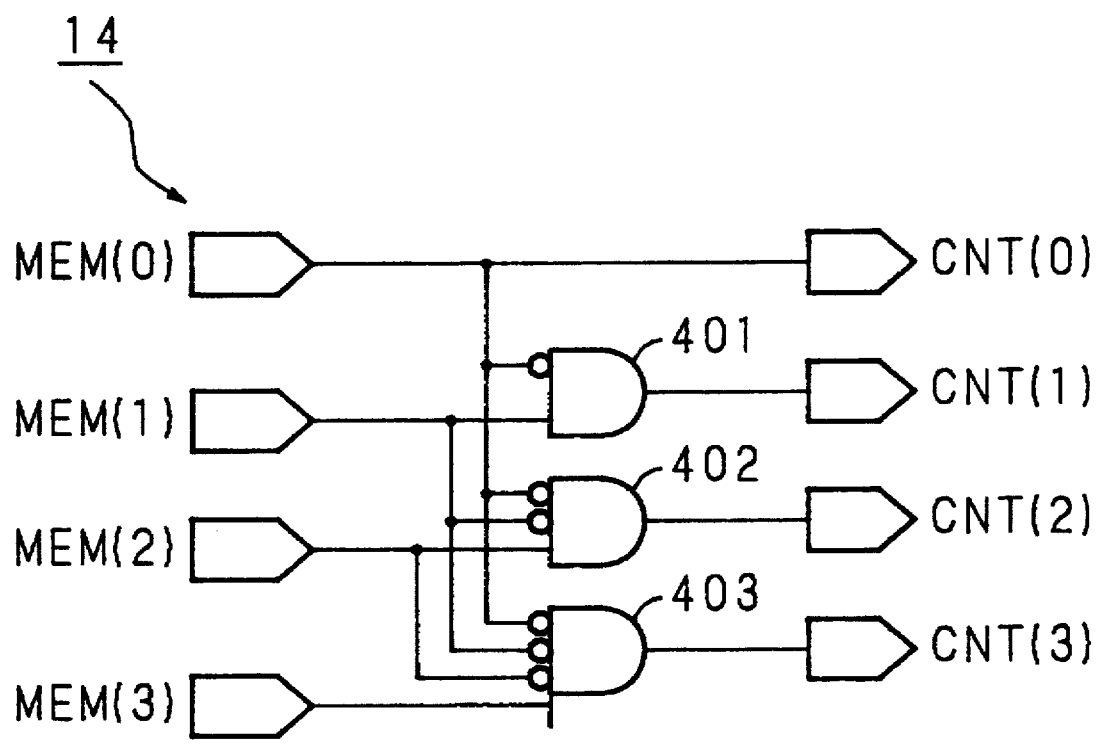
FIG. 7 is a structural circuit diagram of a priority control circuit 14 in FIG. 5.

FIG. 7 is a circuit diagram showing the constitution of the priority control circuit 14. The priority control circuit 14 includes an AND gate 401 for outputting the MEM(0) signal from the memory area control circuit (0) 10 as a CNT(0) signal and outputting a CNT(1) signal when receiving two inputs of an inverted signal of the MEM(0) signal and the MEM(1) signal from the memory area control circuit (1) 11, an AND gate 402 having three inputs of inverted MEM(0) and MEM(1) signals and the MEM(2) signal from the memory area control circuit (2) 12 and outputting a CNT(2) signal, and an AND gate 403 having four inputs of inverted MEM(0) to MEM(2) signals and the MEM(3) signal from the memory area control circuit (3) 13 and outputting a CNT(3) signal. The priority control circuit 14 sets entries 0 to 3 corresponding to the memory area control circuits (0:3) 10 to 13 in the order of priority: entry 0>entry 1>entry 2>entry 3.

Figure 8:
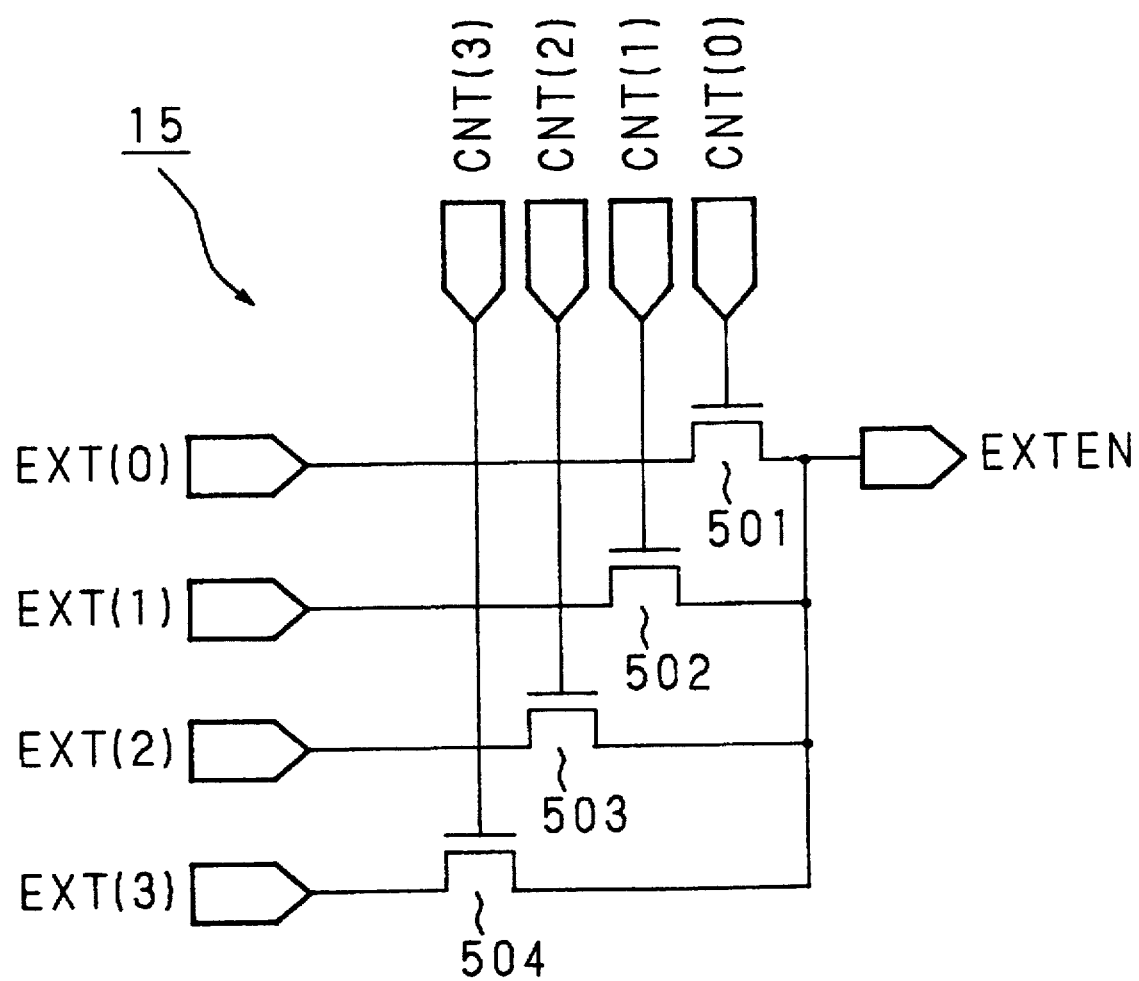
FIG. 8 is a structural circuit diagram of an external input signal check control circuit 15 in FIG. 5.

FIG. 8 is a circuit diagram showing the structure of the external input signal check control circuit 15. The circuit 15 comprises N-channel transmission gates (hereinafter referred to as "NchTG") 501 to 504 having CNT(0) to CNT(3) signals input to gates thereof, EXT(0) to EXT(3) signals input to sources thereof and outputting the EXTEN signal through drains thereof, respectively.

Figure 9:
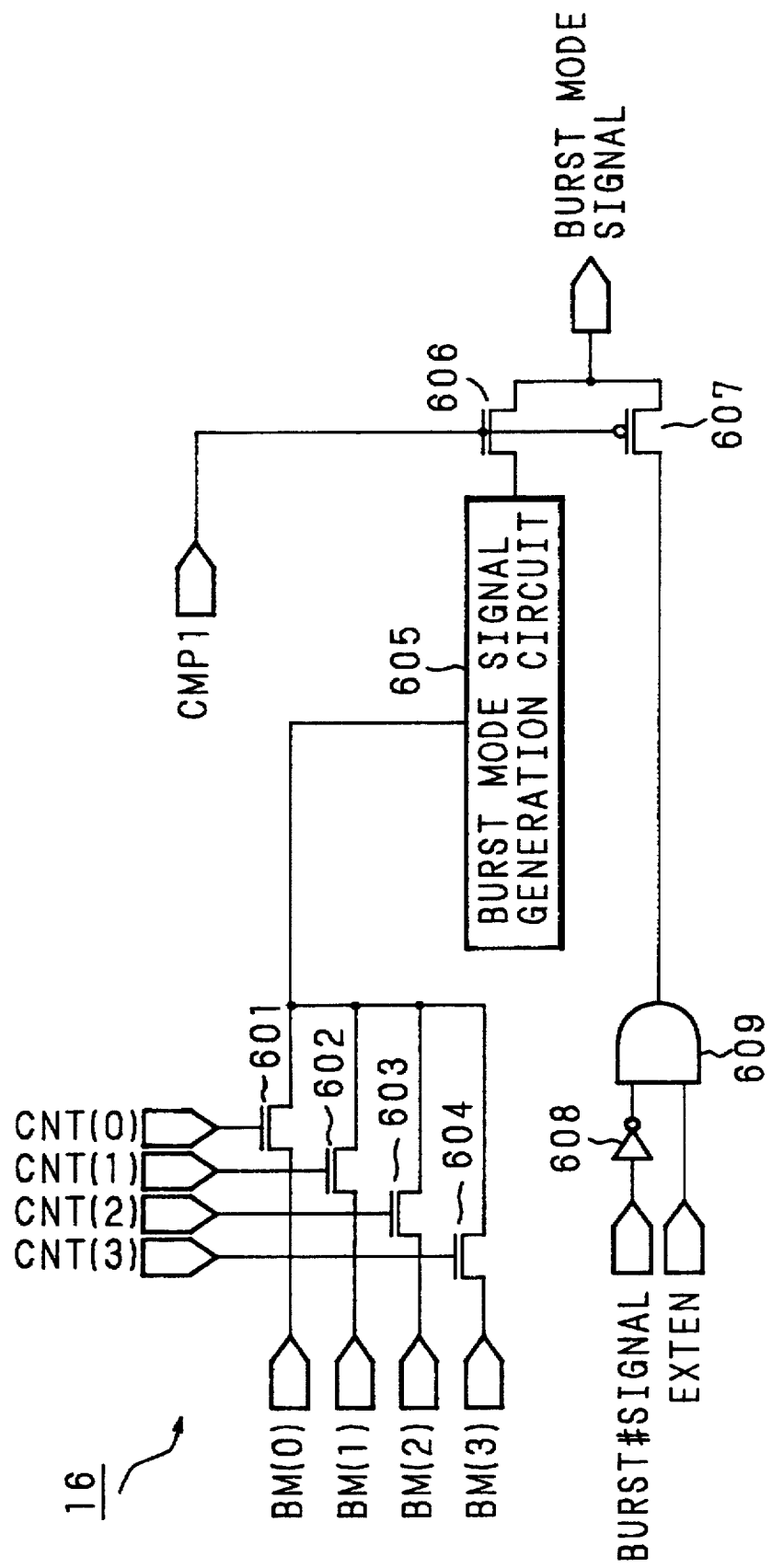
FIG. 9 is a structural circuit diagram of a burst transfer control circuit 16 in FIG. 5.

FIG. 9 is a circuit diagram showing the structure of the burst transfer control circuit 16. The burst transfer control circuit 16 includes NchTGs 601 to 604 each receiving the CNT(0:3) signal as gate input and the BM(0:3) signal as a source input while generating a drain output to a burst mode signal generation circuit 605, an AND gate 609 to which a signal obtained by inverting the BURST# signal from the memory controller 2 at an inverter 608 and the EXTEN signal from the external input signal check control circuit 15 are input, an NchTG 606 having the CMP1 signal from the single cycle wait control circuit 17 applied thereto as a gate input, with a source thereof connected to the burst mode signal generation circuit 605, and outputting a drain output to the bus interface control circuit 20 as a burst mode signal, and a P-channel transmission gate 607 (hereinafter referred to as "PchTG") having an inverted signal of the CMP1 signal as a gate input, with a source thereof connected to an output of the AND gate 609, and generating a drain output to the bus interface control circuit 20 as the burst mode signal.

Figure 10:
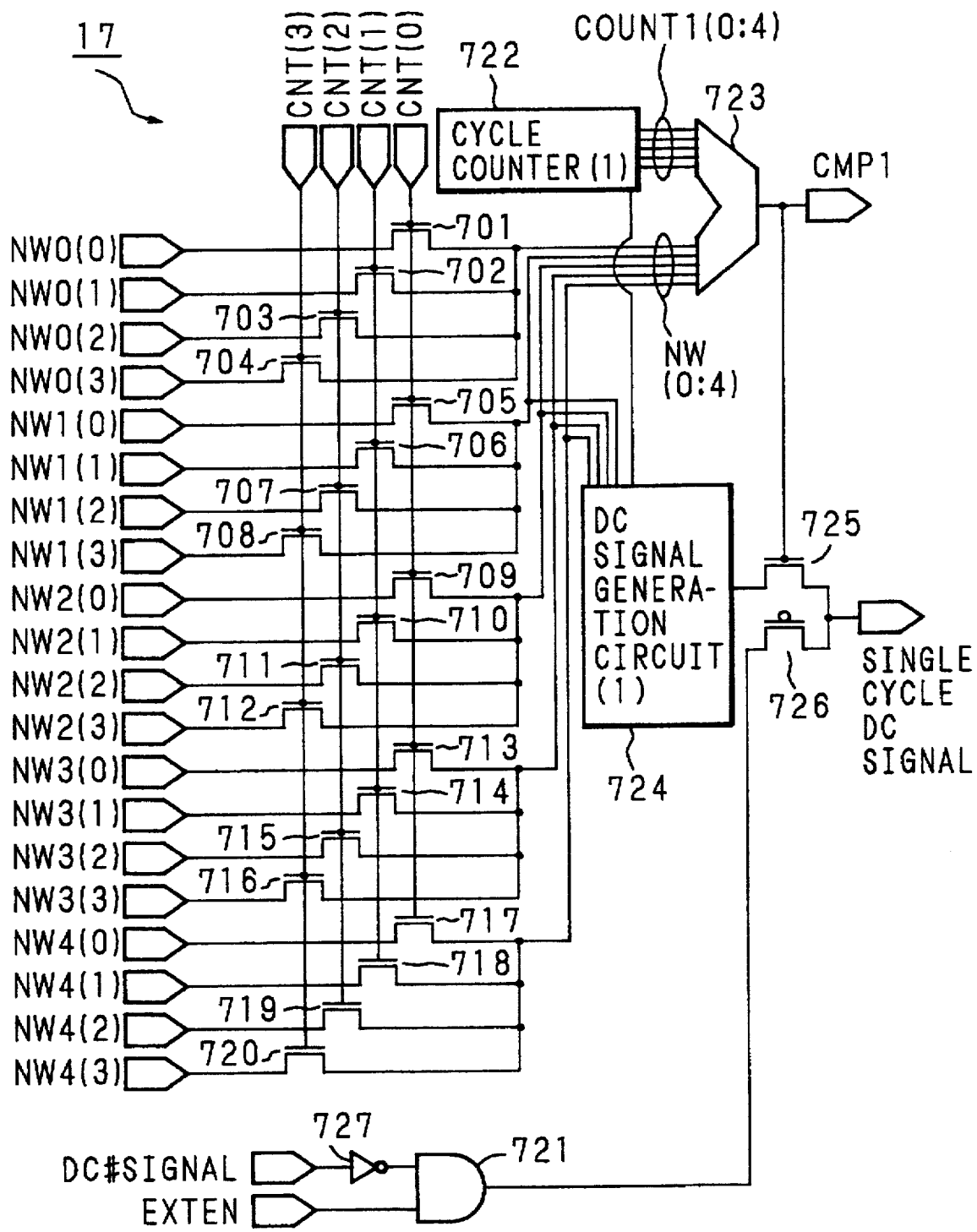
FIG. 10 is a structural circuit diagram of a single cycle wait control circuit 17 in FIG. 5.

FIG. 10 is a structural circuit diagram of the single cycle wait control circuit 17. The single cycle wait control circuit 17 is comprised of NchTGs 701 to 720 each receiving the CNT(0:3) signal as gate input and the NW(0:4) signal as source input and with having a drain thereof connected to a comparator (1) 723, an AND gate 721 having two inputs, that is, a signal obtained by inverting the DC# signal from the memory controller 2 at an inverter 727 and the EXTEN signal from the external input signal check control circuit 15, the comparator (1) 723 for comparing the drain output NW(0:4) of the NchTG 701 to 720 selectively turned on by the CNT(0:3) signal with a COUNT1(0:4) signal from a cycle counter (1) 722 and outputting the CMP1 signal as the result of the comparison, a DC signal generation circuit (1) 724 for generating a signal providing a base of single cycle DC signal in synchronism with the NW(0:4) signal and the counting operation of the cycle counter (1) 722, an NchTG 723 with having the CMP1 signal as a gate input, with a source thereof connected to the DC signal generation circuit (1) 724, and generating a drain output to the bus interface control circuit 20 as the single cycle DC signal, and a PchTG 728 having a gate input of an inverted CMP1 signal, with a source thereof connected to an output of the gate 721, and outputting a drain output to the bus interface control circuit 20 as the single cycle DC signal.

Figure 11:
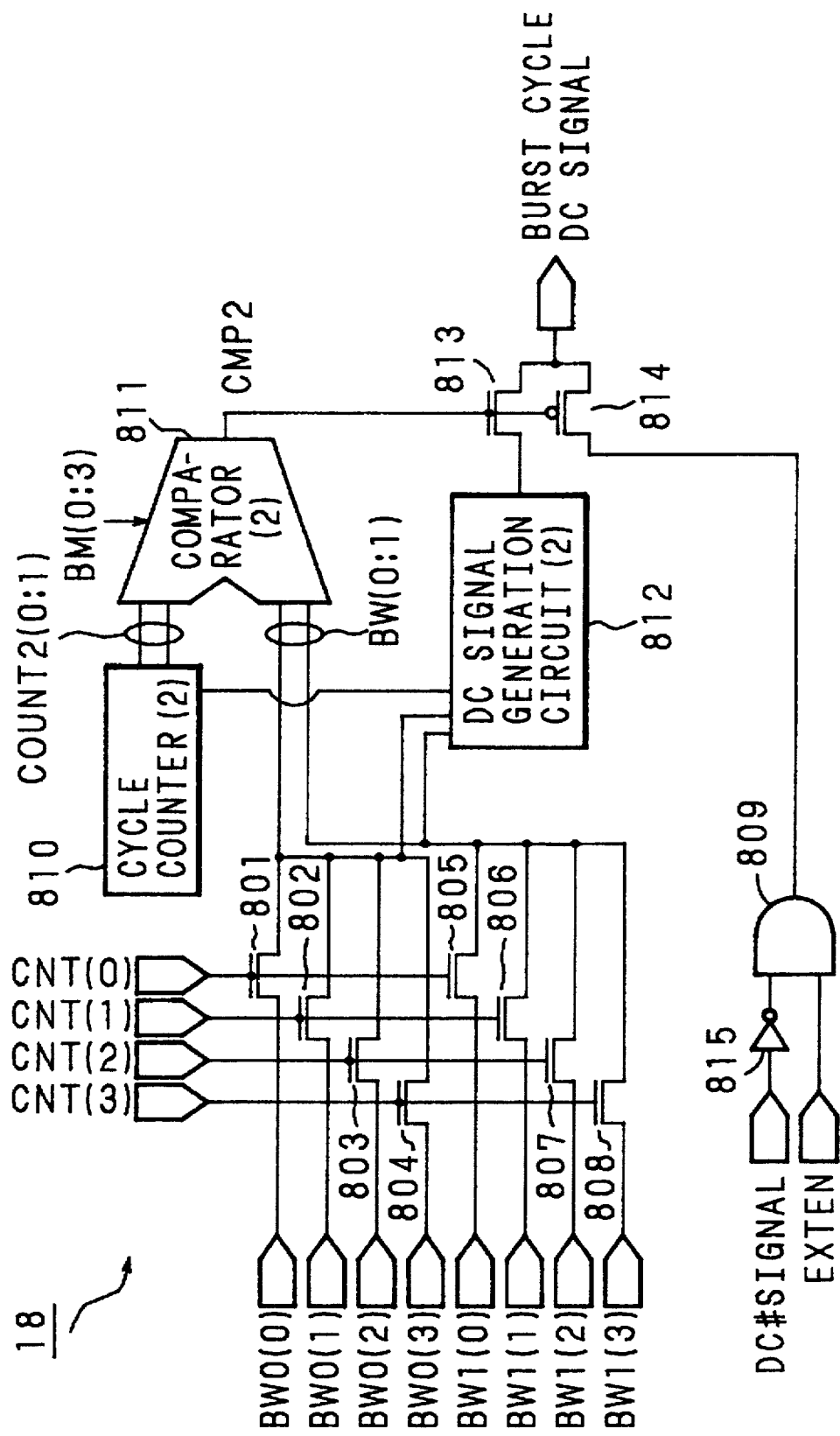
FIG. 11 is a structural circuit diagram of a burst cycle wait control circuit 18 in FIG. 5.

FIG. 11 is a circuit diagram showing the constitution of the burst cycle wait control circuit 18. The burst cycle wait control circuit 18 is constituted of NchTGs 801 to 808 respectively having CNT(0:3) signals input thereto as gate inputs and the BW(0:1) signals as source inputs, with drains thereof connected to a comparator (2) 811, an AND gate 809 with two inputs of an inverted signal of the DC# signal from the memory controller 2 obtained at an inverter 815 and the EXTEN signal from the external input signal check control circuit 18, the comparator (2) 811 for comparing a BW(0:1) signal as a drain output of the NchTG 801 to 808 selectively turned on by the CNT(0:3) signal with a COUNT2(0:1) signal from a cycle counter (2) 810 thereby producing a CMP2 signal as the result of the comparison on one hand, while having an output thereof fixed to 0'B in the case where the BM(0:3) signal is 0'B, a DC signal generation circuit (2) 812 for generating a signal which is a base of a burst cycle DC signal synchronously with each BW(0:1) signal and the Counting operation of the cycle counter (2) 810, an NchTG 813 having the CMP2 signal input thereto as a gate input, with a source thereof connected to the DC signal generation circuit (2) 812, and with generating a drain output to the bus interface control circuit 20 as the burst cycle DC signal, and a PchTG 814 having an inverted CMP2 signal as a gate input thereto, with a source thereof connected to an output of the AND gate 809 and outputting a drain output to the bus interface control circuit 20 as the burst cycle DC signal.

Figure 12:
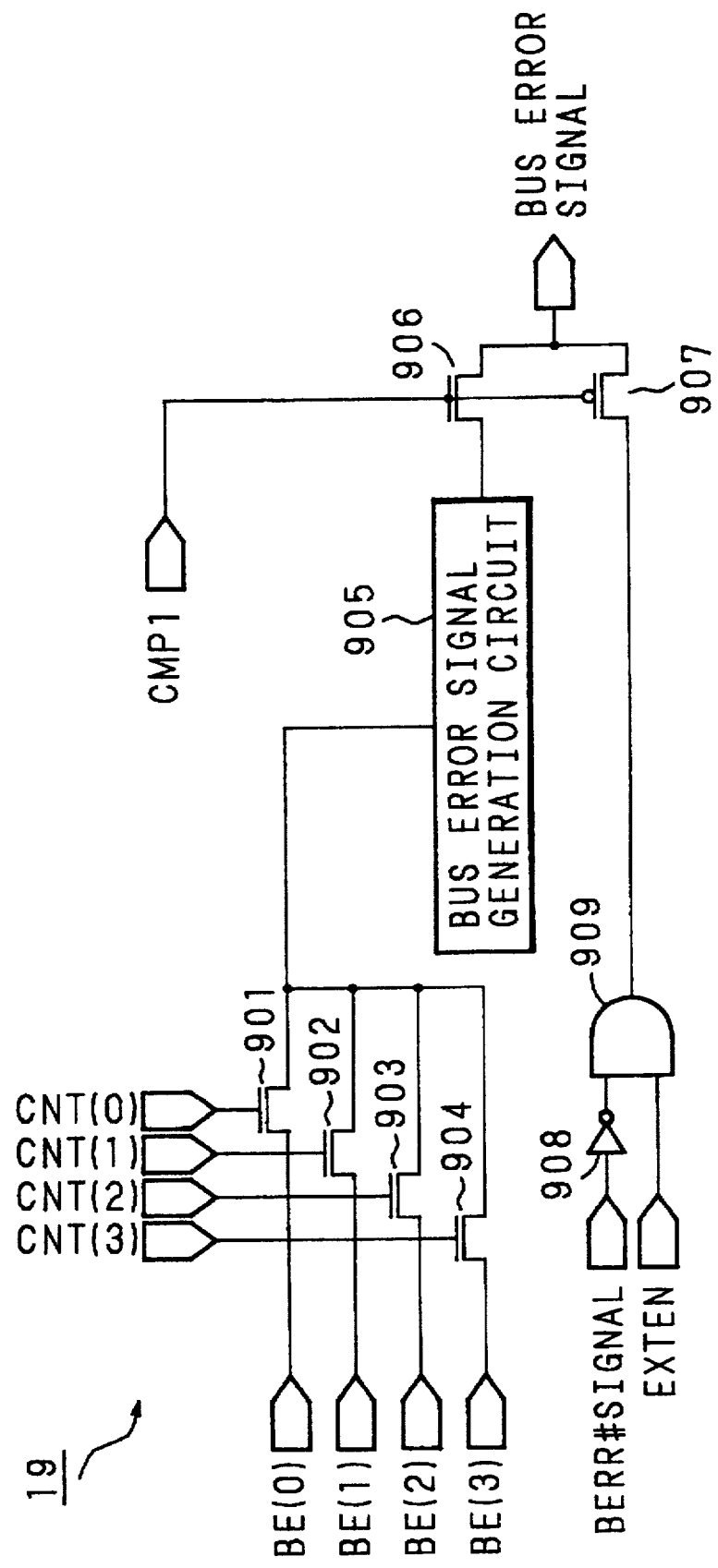
FIG. 12 is a structural circuit diagram of a bus error control circuit 19 in FIG. 5.

FIG. 12 is a circuit diagram showing the structure of the bus error control circuit 19. The bus error control circuit 19 is composed of NchTGs 901 to 904 with CNT(0:3) signals input as gate inputs and BE(0:3) signals as source inputs thereto, with drains thereof connected to a bus error signal generation circuit 905, an AND gate 909 having two inputs, i.e., a signal inverted from the BERR# signal from the memory controller 2 by an inverter 908 and the EXTEN signal from the external input signal check control circuit 15, an NchTG 906 having the CMP1 signal as a gate input thereto, with a source thereof connected to the bus error signal generation circuit 905, while outputting a drain output to the bus interface control circuit 20 as a bus error signal, and a PchTG 907 having an inverted CMP1 signal as a gate input thereto, with a source thereof connected to an output of the AND gate 909, and outputting a drain output to the bus interface control circuit 20 as the bus error signal.

Figure 13:
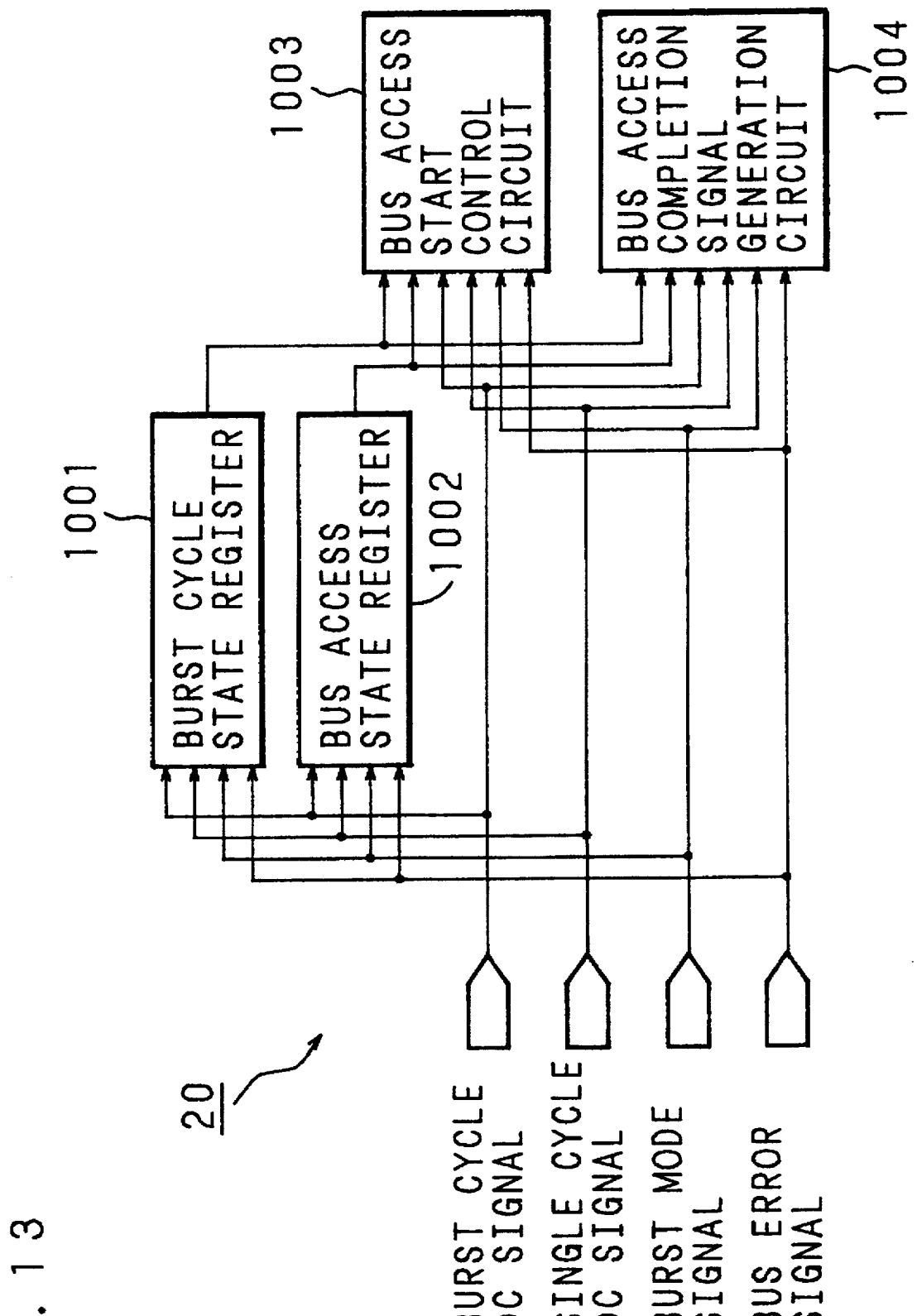
FIG. 13 is a structural block diagram of a bus interface control circuit 20 in FIG. 5.

FIG. 13 is a structural block diagram of the bus interface control circuit 20. The bus interface control circuit 20 is provided with a burst cycle state register 1001 for storing a burst cycle state, a bus access state register 1002 for storing a bus access state, a bus access start control circuit 1003 for controlling the start of bus access and a bus access completion signal generation circuit 1004 for generating a bus access completion signal, wherein each of the burst cycle DC signal from the burst cycle wait control circuit 18, the single cycle DC signal from the single cycle wait control circuit 17, the burst mode signal from the burst transfer control circuit 18 and the bus error signal from the bus error control circuit 19 is applied to the burst cycle state register 1001, the bus access state register 1002, the bus access start control circuit 1003 and the bus access completion signal generation circuit 1004, thereby changing the bus access state and controlling the start and completion of bus access.

Figure 14:
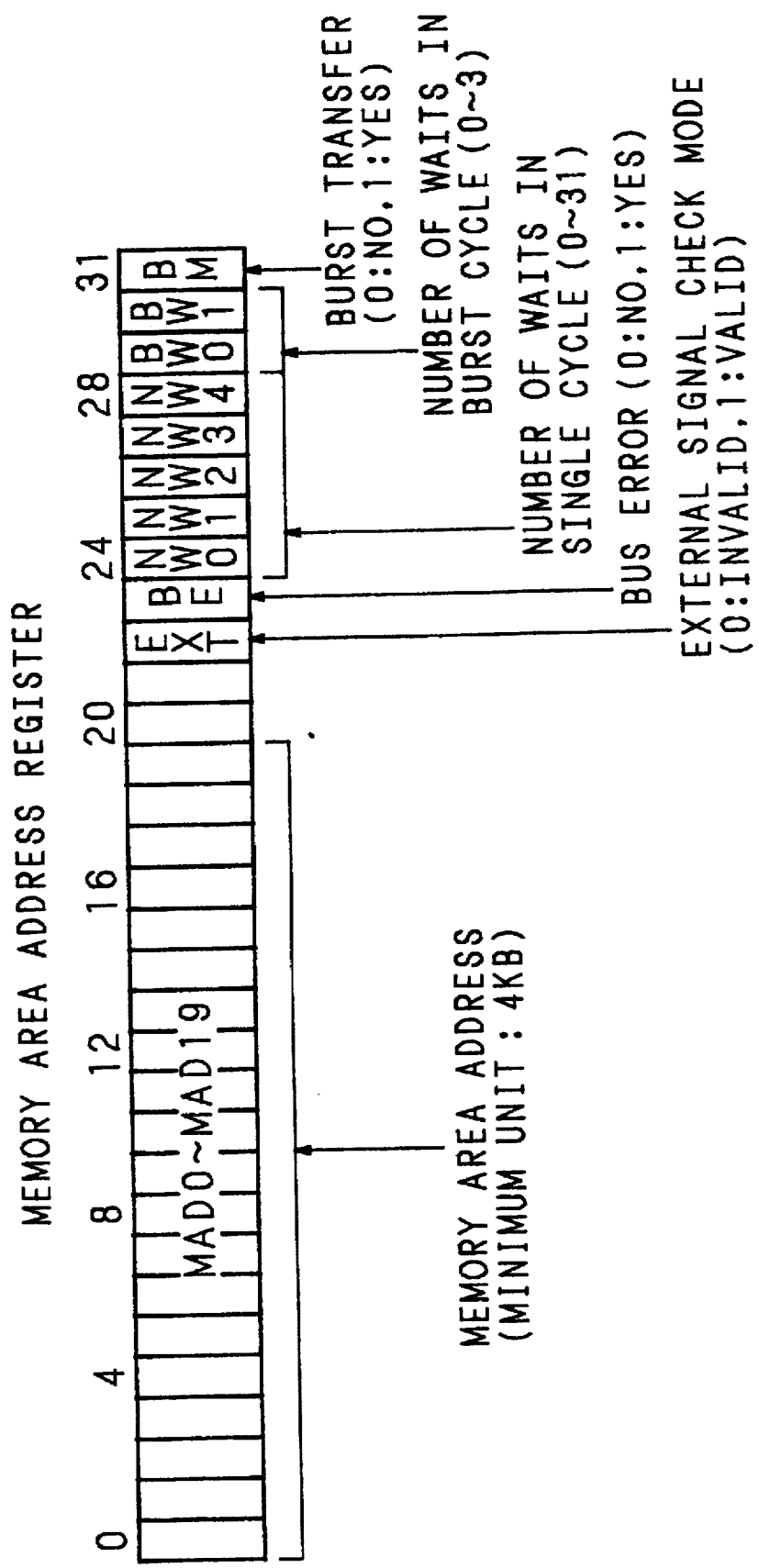
FIG. 14 is a diagram showing the bit assignment of a memory area address register.
Figure 15:
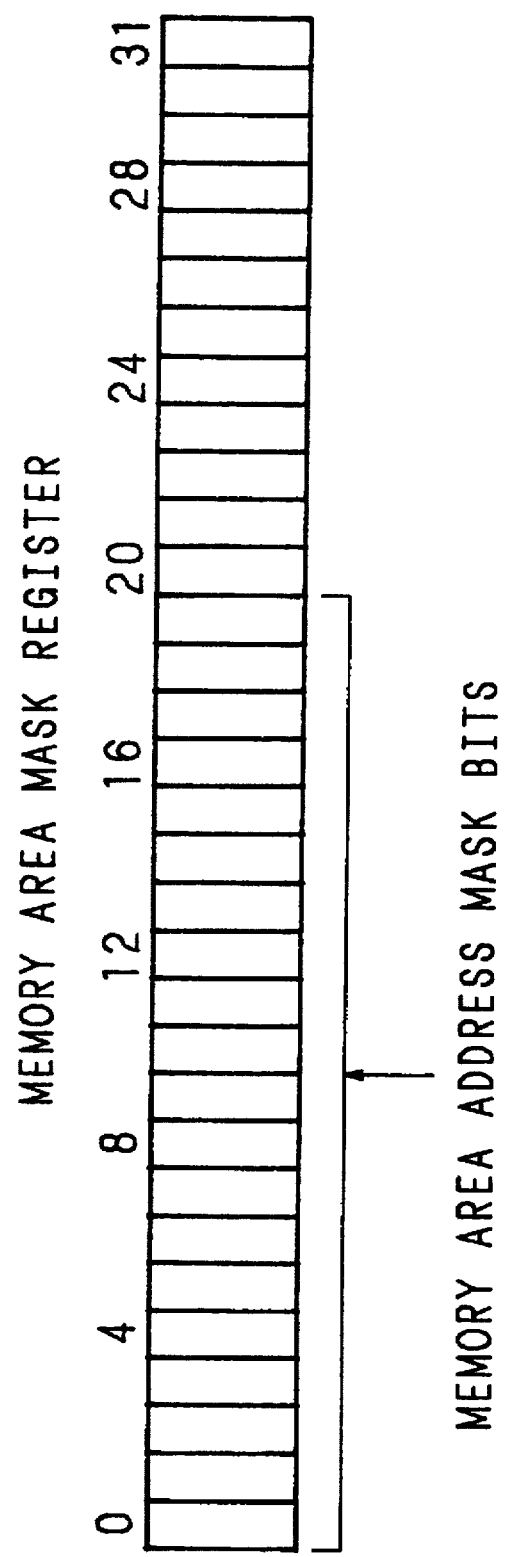
FIG. 15 is a diagram showing the bit assignment of a memory area mask register.
Figure 18:
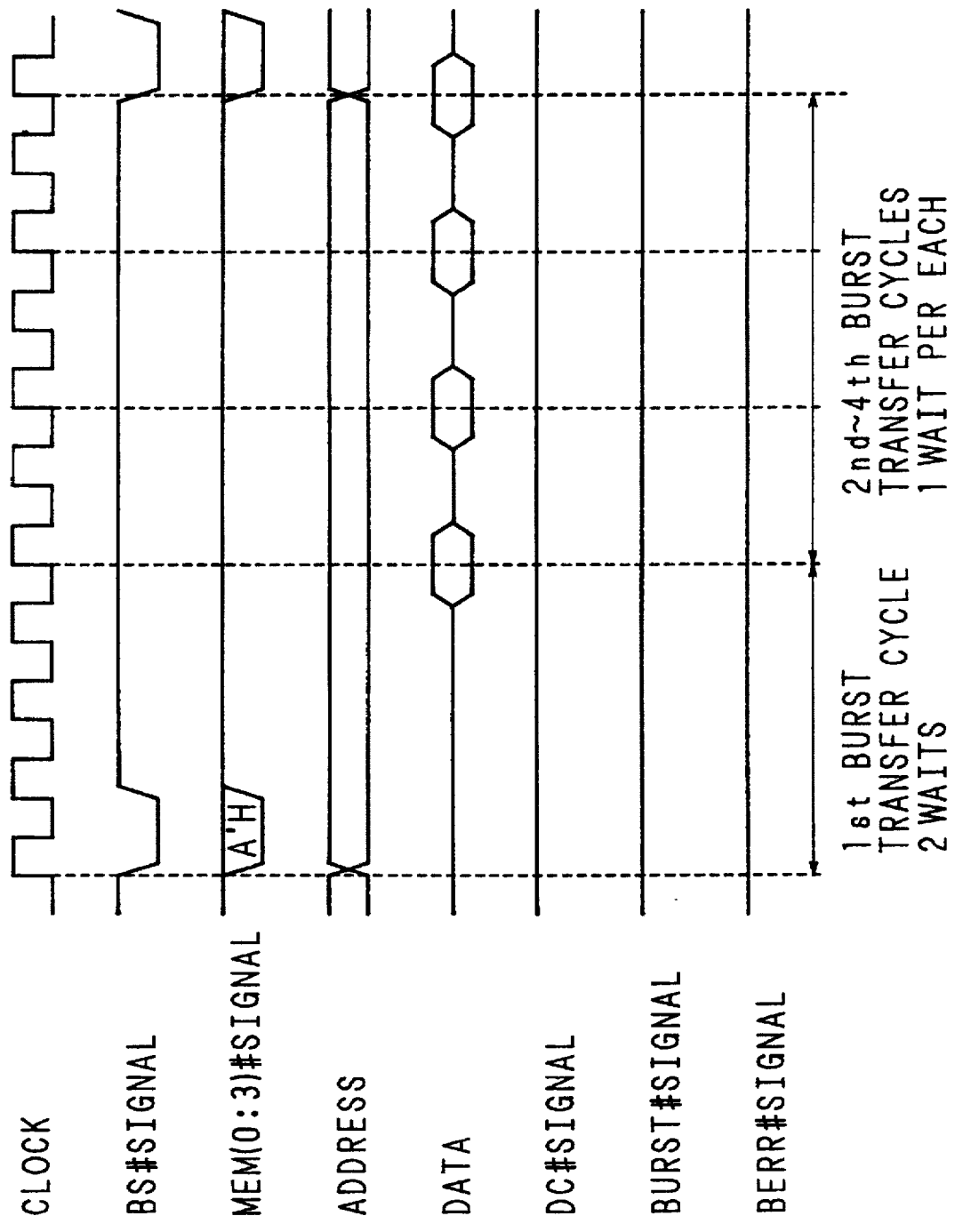
FIG. 18 is a timing chart at a burst transfer read access made to area 1.

FIG. 14 is a diagram showing the bit assignment of the memory area address register, and FIG. 15 a diagram of the bit assignment of the memory area mask register. FIG. 18 is a memory map of an address space designated by a unit of a four-entry memory area address register and a four-entry memory area mask register installed in each of the four memory area control circuits (0:8) 10 to 18. FIG. 17 is a table showing values of the memory area address registers and the memory area mask registers in hexadecimal notation at the designation of memory areas as shown in FIG. 18.

0–10th bits of the memory area address register are assigned to the most significant 20 MAD(0:19) bits (first bit string) of the head address of each of memory areas 0 to 3; 22nd bit is assigned to an EXT bit (0: invalid, 1: valid) (fourth bit) indicating whether the external input signal check mode is to be set to refer to the external input signal from the memory controller 2; 23rd bit is assigned to a BE bit (0: No, 1: Yes) (sixth bit) indicating the presence or absence of a bus error; 24–28th bits are assigned to NW(0:4) bits (second bit string) indicating the number of waits (0:31) for the single cycle; 20–80th bits are assigned to BW(0:1) bits (second bit string) indicating the number of waits (0:3) for the burst cycle; and 31st bit is assigned to a BM bit (0: No, 1: Yes) indicating the presence or absence of a burst transfer.

In bits 0 to 19 of the memory area mask register are assigned mask bits (third bit string) for masking a predetermined number of least significant ones of the most significant 20 bits of the address to be accessed in accordance with the size of the memory area to be designated and thus specifying the size of memory areas 0 to 3. According to this embodiment, an area of 4 KB can be designated if the mask bits are all set to 1'B. In the case where all the mask bits are set to 0'B, an area of 4 GB can be designated, so that a memory area of an arbitrary size can be designated in the range of 4 GB to 4 KB with mask bits of 00000'H to 11111'H ('H hereinafter denotes a hexadecimal number).

According to this embodiment, a bit pattern shown in FIG. 17 is assigned to the register set of four entries. Entry 0 designates area 0 of D0000000'H to D0FFFFFF'H where the number of waits for the single cycle is 1, the number of waits for the burst cycle is 0, with YES for the burst transfer, NO for the burst error, and NO for the external input signal check mode. Entry 1 indicates area 1 of 00000000'H to 0FFFFFFF'H wherein the number of single cycle waits is 2, the number of burst cycle waits is 2, YES for the burst transfer, NO for the burst error and YES for the external input signal check mode. Entry 2 shows area 2 of E0000000'H to FFFFFFFF'H in which the number of waits for the single cycle is 3, with NO for the burst transfer, NO for the bus error whereas YES for the external input signal check mode. Entry 3 is area 3 of 00000000'H to FFFFFFFF'H having the number of waits for the single cycle of 31, with NO for the burst transfer, YES for the bus error, and YES for the external input signal check mode. Without a burst transfer in entries 2 and 3, the designation of the number of waits for the burst cycle, if any, is ignored.

Also, the data processing system according to the invention allows the overlapping of memory areas designated by the register sets with four entries. Entry 3 thus designates all the memory areas, i.e., a memory area overlapping with the memory areas of the remaining three entries 0 to 2.

Now, the operation of the data processing system according to the invention will be explained.

Figure 16:
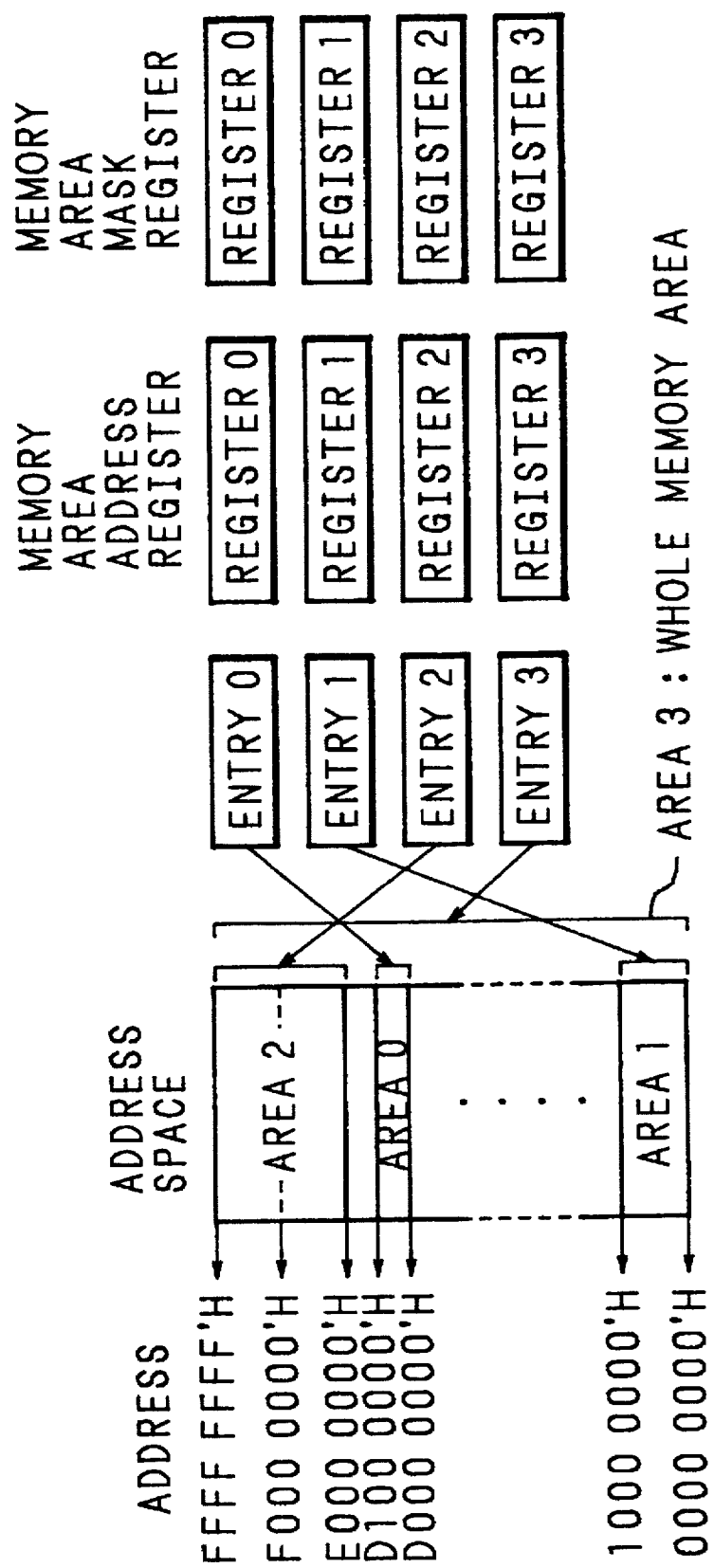
FIG. 16 is a memory map on an address space set by four sets of memory area address registers and memory area mask registers.
Figure 19:
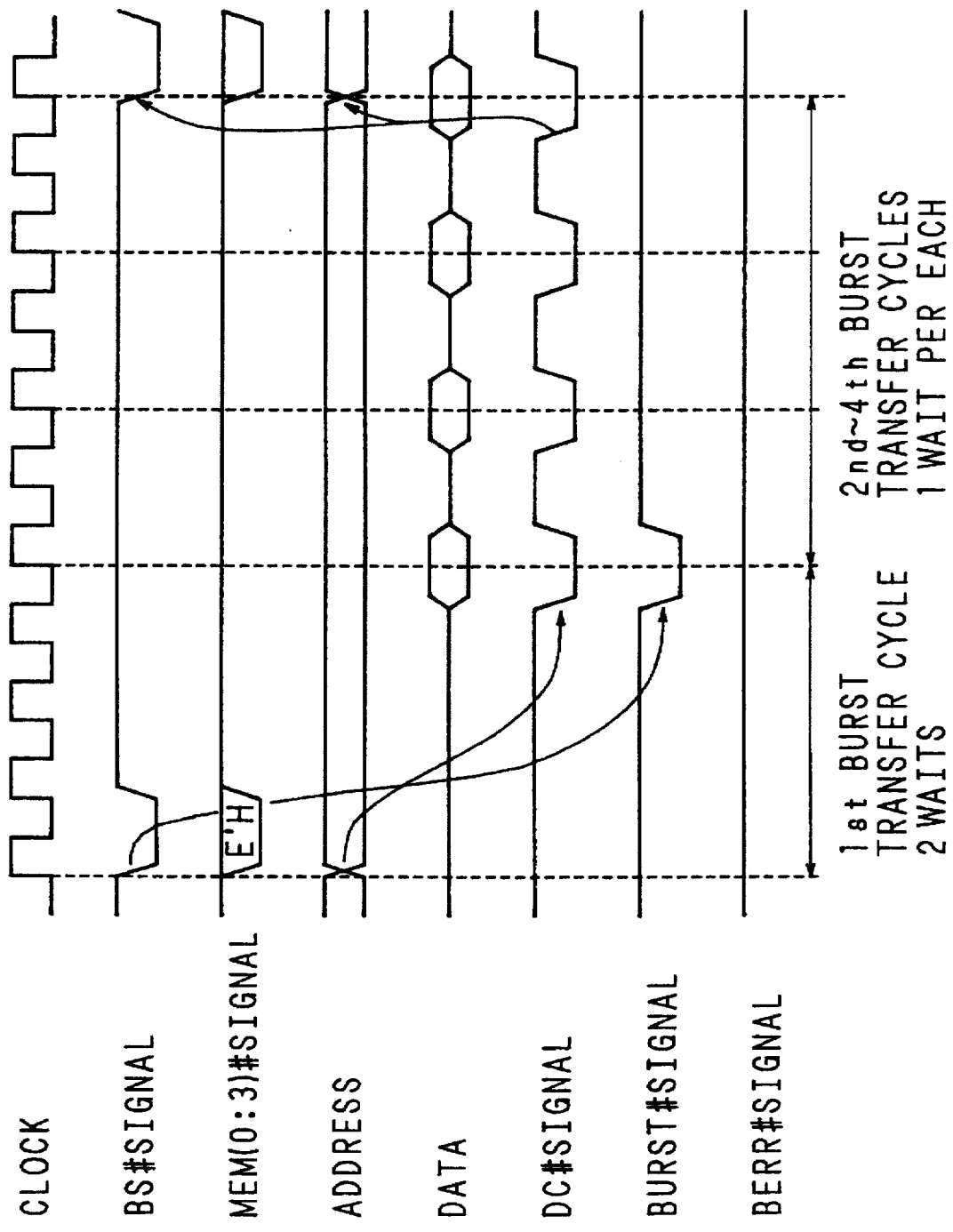
FIG. 19 is a timing chart at a burst transfer read access made to area 3 equipped with a memory, other than areas 0 to 2.

FIGS. 18 and 19 are timing charts at a read access made by the data processing system according to the invention in the burst transfer. Specifically, FIG. 18 represents a case in which area 1 is accessed, and FIG. 19 a case in which an area other than areas 0 to 2 shown in FIG. 16 is accessed.

1) Access to area 1

The microprocessor 1, whenever it becomes necessary to make access to the memory 3, sends information required for the access including an access request generated in an internal data arithmetic section or the like (not shown) together with the address, data length, direction of transfer (read/write) and, appropriate data in the case of a write cycle, to the bus interface control circuit 20. The bus interface circuit 20, upon receipt of these informations, starts bus access. The bus access to the memory 3 is carried out through the memory controller 2. The bus controller 4 applies a 32-bit address, a BS# signal, a R/W# signal and a MEM(0:3)# signal to the memory controller 2. On the other hand, a DC# signal, a BURST# signal and a BERR# signal are sent to the bus controller 4 from the memory controller 2 32-bit data are exchanged between the controllers 4 and 2.

When the microprocessor 1 requests the access, the above-mentioned informations are input to the bus interface control circuit 20. At the same time, the most significant 20 bits (AD(0:19) bits in FIG. 6) of the address are fed to the memory area control circuits (0:3) 10 to 13. Upon receipt of the AD(0:19) signal, each AND gate 303 operates AND of the AD(0:19) bit and the most significant bit (0 to 19 bits) of the memory area mask register. For the 1'B portion of the mask bits of the memory area mask register, the AD bit is output directly from the AND gate 303, while 0'B is output for the 0'B portion. As a result, the head address of the memory area of a size designated by the mask bits and containing the address to be accessed is extracted from the particular address.

Then, the EX-NOR gates 304, 304, . . . check to see whether the outputs from the AND gates 303, 303, . . . are coincident with the most significant 20 bits (bits 0 to 19) of the memory area address register. Further, the AND gate 305 checks to see whether all the outputs from the EX-NOR gates 304, 304, . . . indicate coincidence between the outputs from the AND gates 303, 303, . . . and bits 0 to 19 of the memory area address register. The same operation is performed in each of the memory area control circuits (0:3) 10 to 13, thereby determining which of the memory areas designated by the four sets of registers contains the address to be accessed depending on whether the MEM(0:3) signal is 0'B or 1'B.

If the to-be-accessed address is contained in area 1 on the memory space, MEM(1) assumes 1'B, which is output as MEM(1)# inverted by the inverter 21 at the starting time of access. Entry 3 designates all the memory areas, and therefore MEM(3) is 1'B and hence MEM(3)# is 0'B. The address to be accessed is not included in the areas designated by entries 0 and 2. Thus, MEM(0), MEM(2) are 0'B, and MEM(0)#, MEM(2)# are consequently 1'B. The MEM (0:3)# signal is output simultaneously with the BS# signal at the starting time of access.

The memory controller 2 starts operating when receiving the MEM(0:3)# signal. Since area 1 is to be accessed in the example, the MEM(1)# signal is asserted- The assertion of the MEM(1)# signal means that the most significant four bits of the address coincide with the most significant four bits of the memory area address register (1) because only the most significant four bits are set to 1'B in the memory area mask register (1) of area 1. Accordingly, the most significant four bits of the address are of the same value as that of the most significant four bits of the memory area address register (1) without being decoded. It is enough for the memory controller 2, therefore, to decode necessary ones of the least significant 28 bits.

FIG. 18 is the timing chart at the read access to area 1 in the burst transfer. Though not shown, before the access is started, the memory area control circuits (0:3) 10 to 13 check the address. The BS# signal starts the bus access. At the same time, the MEM(0:3)# signal and the address are output. Since only the MEM(1) and MEM(3) signals are 1'B, the MEM(0:3)# signal is A'H.

The memory controller 2 of the data processing system according to the invention is set to perform the burst transfer in one single cycle (first cycle) followed by three burst cycles (second to fourth cycles). The single cycle and the burst cycle have the shortest (0 wait) period of two clocks and one clock respectively.

The memory address register (1) for area 1 is set so that the number of waits in the single cycle is 2, that in the burst cycle is 1, with the burst transfer, without a bus error and with the external input signal check mode. When area 1 is accessed, the number of clocks is automatically counted in the bus controller 4. As a result, the bus access is conducted sequentially as shown in FIG. 18 although the DC# signal, the BURST# signal or the BERR# signal is not generated to the microprocessor 1 by the memory controller 2. In this case, the only thing that is required of the memory controller 2 is to output data at predetermined timings.

The MEM(0:3) signals generated at the memory area control circuits (0:3) 10 to 13 immediately before the access to area 1 is started are applied to the priority control circuit 14. In the process, only the MEM(1) signal and MEM(3) signal are 1'B, and therefore the MEM(0:3) signal shows a value of 5'H.

The order of priority of the entries of the four sets of registers designating the memory areas is set to be entry 0>entry 1>entry 2>entry 3 in the priority control circuit 14 as discussed earlier. When the MEM(0:3) signal is 5'H, therefore, only the CNT(1) signal is 1'B, and the CNT(0:3) signal, that is, the output of the priority control circuit 14 is eventually 4'H. The CNT(0:1) signal is applied to the external input signal check control circuit 15, the burst transfer control circuit 16, the single cycle wait control circuit 17, the burst cycle wait control circuit 18 and the bus error control circuit 19. The CNT(0:1) signal is thus controlled so that informations of only entry 1 among the four entries are used in each control circuit.

The external input signal check circuit 15 receives the CNT(0:3) signal and the EXT(0:3)-bit signal of each entry of the memory address registers (0:3). The CNT(0:3) signal is 4'H, and therefore only NchTG 502 is turned on, with a value of EXT(1) bits being output as the EXTEN signal. In the case of this access, the value of EXT(1) bits is 1'B, and therefore the EXTEN signal is also 1'B.

The EXTEN signal is supplied to the burst transfer control circuit 16, the single cycle wait control circuit 17, the burst cycle wait control circuit 18 and the bus error control circuit 19. The EXTEN signal is used to control to see whether the external input signal from the memory controller 2 is to be referred to at each control circuit.

The single cycle wait control circuit 17 has the NW 0-4(0:3)-bit signal of each entry of the memory area address registers (0:3), the CNT(0:3) signal, the DC signal and the EXTEN signal input thereto. The CNT(0:3) signal is 4'H, whereby NchTGs 702, 706, 710, 714 and 718 are turned on, and 00010'B (=2 waits) of each of NW0(1), NW1(1), NW2(1), NW3(1) and NW4(1) bits is impressed as the NW(0:4) signal to the comparator (1) 723.

The cycle counter (1) 722, because of the number of waits of 2 in the single cycle, starts counting with setting the second single cycle to be 0, and sends the counted value to the comparator (1) 723 as the COUNT1(0:4) signal. The comparator (1) 723 compares the NW(0:4) signal with the COUNT1(0:4) signal. As long as NW(0:4) is larger than COUNT1(0:4), the comparator (1) 723 outputs 0'B. When NW(0:4) becomes equal to or smaller than COUNT1(0:4), the comparator outputs 1'H. Since the EXTEN signal is 1'B, during the single cycle before the counted value by the cycle counter (1) 722 reaches the number of waits set by the memory area address register (during the period when NW(0:4) is larger than COUNT1(0:4)), PchTG 726 is turned on, and an AND signal of an inverted signal of the DC# signal from the external memory controller 2 and the EXTEN signal is output as the single cycle DC signal to the bus interface control circuit 20. When the counted value on the cycle counter (1) 722 becomes the same as the number of waits set by the memory area address register (NW(0:4) =COUNT1(0:4)), NchTG 725 is turned on. The DC signal generated in the DC signal generation circuit (1) 724 is accordingly supplied as the single cycle DC signal to the bus interface control circuit 20. When NW(0:4) becomes smaller than COUNT1(0:4), no DC signal is generated by the DC signal generation circuit (1) 724 although NChTG 725 is on.

To the burst cycle wait control circuit 18 are supplied the BW0(0:3) and BW1(0:3) bit signals of the memory area address registers (0:3), the CNT(0:3) signal, the DC# signal and the EXTEN signal. The CNT(0:3) signal is 4'H, and therefore NchTGs 802.806 are turned on, so that 01'B of each of BW0(1), BW1(1) bits (=one wait) is applied as the BW(0:1) signal to the comparator (1) 811.

The cycle counter (2) 810 starts counting from 0 at the start of each burst cycle because the number of waits of the burst cycle is 1. The count is sent out as the COUNT2(0:1) signal to the comparator (2) 811. The comparator (2) 811 compares the BW(0:1) signal and COUNT2(0:1) signal. As long as BW(0:1) is larger than COUNT2(0:1), the comparator (2) 811 outputs 0'B. However, when BW(0:1) becomes equal to or smaller than COUNT2(0:1), 1'B is outputted. The output of the comparator (2) 811 is fed to NchTG 813 and PchTG 814.

The EXTEN signal is 1'B. Before the cycle counter (2) 810 counts the number of waits set by the memory area address register (during the period when BW(0:1) is larger than COUNT2(0:1)) in the single cycle, PchTG 814 is turned on. An AND signal of an inverted signal of the DC# signal from the external memory controller 2 and the EXTEN signal is generated as the burst cycle DC signal to the bus interface control circuit 20.

When the counted value of the cycle counter (2) 810 reaches a number equal to the number of waits set by the memory area address register (BW(0:1)=COUNT2(0:1)), NchTG 813 is turned on. The DC signal generated by the DC signal generation circuit (2) 812 is thus applied as the burst cycle DC signal to the bus interface control circuit 20. When BW(0:1) becomes smaller than COUNT2(0:1), on the other hand, no DC signal is generated by the DC signal generation circuit (2) 812 although NchTG 813 is kept on.

The burst transfer control circuit 18 has inputs of the BM(0:3)-bit signal of each entry of the memory area address registers (0:3), the CNT(0:3) signal, the BURST# signal, the EXTEN signal and the CMP1 signal generated by the single cycle wait control circuit 17. The CNT(0:3) signal is 4'H, and therefore only NchTG 802 is turned on, and 1'B of BM(1) bits (Yes for the burst transfer) is applied to the burst mode signal generation circuit 805.

In the data processing system according to the invention, whether the burst transfer is to be performed or not is determined at the completing time of the single cycle. More specifically, the value of the CMP1 signal indicating whether the number of single cycle waits has reached a set value determines which of the internally-generated burst mode signal and the BURST# signal supplied from outside is to be used. During the time when NW(0:4) is larger than COUNT1(0:4), PchTG 807 is turned on, and the inverted signal of the external BURST# signal is applied to the bus interface control circuit 20 as the burst mode signal. On the other hand, when NW(0:4) becomes equal to or smaller than COUNT1(0:4), NchTG 808 is turned on, so that the signal generated by the burst mode signal generation circuit 805 is supplied as the burst mode signal to the bus interface control circuit 20.

The BE(0:3)-bit signal of each entry of the memory area address registers (0:3), the CNT(0:3) signal, the BERR#signal, the EXTEN signal and the CMP1 signal generated by the single cycle wait control circuit 17 are input to the bus error control circuit 19. The CNT(0:3) signal is 4'H, and therefore only NchTG 902 is turned on, thereby to apply the BE(1)-bit 0'B (No for a bus error) to the bus error signal generation circuit 905.

In the data processing system of the invention, whether the generation of a bus error is to be detected or not is determined at the completing time single cycle. In other words, the value of the CMP1 signal showing whether the number of single cycle waits has reached a set value determines whether the internally-generated bus error signal or the BERR# signal from the external source is to be used. During the period when NW(0:4) is larger than COUNT1 (0:4), PchTG 907 is turned on, so that the inverted BERR# signal is sent to the bus interface control circuit 20 as the bus error signal. When NW(0:4) becomes equal to or smaller than COUNT1(0:4), however, NchTG 908 is turned on and the bus error signal generated in the bus error signal generation circuit 905 is supplied to the bus interface control circuit 20.

In the bus interface control circuit 20, the single cycle DC signal, the burst cycle DC signal, the burst mode signal and the bus error signal are input to the bus access state register 1002, the burst cycle state register 1001, the bus access start control circuit 1003 and the bus access completion signal generation circuit 1004, whereby the bus access state is changed to control the start and completion of the bus access.

As described above, according to the data processing system of the invention, in making access to an area set by the memory area register and the memory area mask register, it is not necessary to refer to an external input signal.

2) Access to area 3 with a memory, other than areas 0 to 2:

In the case where an address to be accessed resides within area 3 other than areas 0 to 2 on the memory space, only MEM(3) assumes 1'B, and the MEM(3)# (=0'B) inverted by the inverter 21 is output at the starting time of access. This address is not included in the areas designated by entries 0 to 2. MEM(0), MEM(1) and MEM(2) therefore are 0'B, and MEM(0)#, MEM(1)# and MEM(2)# become 1'B. The MEM (0:3)# signal is output simultaneously with the BS#signal at the starting time of access.

FIG. 19 is the timing chart at the read access to area 3 other than areas 0 to 2 in the burst transfer. Though not shown, the address is checked by the memory area control circuits (0:3) 10 to 13 before the access is started. The BS# signal starts the bus access, and at the same time the MEM(0:3)# signal and the address are output. In this example of the access, only the MEM(3) signal is 1'B, and therefore the MEM(0:3)# signal assumes E'H.

Area 3 is so set in the memory controller 2 that the number of waits for the single cycle is 2, and the number of waits for the burst cycle is 1, in the presence of the burst transfer and without a bus error. Meanwhile, in the memory area address register (3), the number of waits for the single cycle is 31, that for the burst cycle is 0, without any burst transfer, with a bus error, and also with the external input signal check mode being set.

As will be described later, in area 3, the memory controller 2 responds earlier before a time corresponding to the number of single cycle waits (=31) set for the memory area address register passes thereby to generate the DC# signal, the BURST# signal and the BERR# signal. Therefore, the microprocessor 1 operates with referring to these external input signals. The timing chart of FIG. 19 represents that the microprocessor 1 operates as set by the memory controller 2.

Since the memory controller 2 is set exactly in the same manner as the memory area address register (1), the timing chart of FIG. 18 at the access to area 1 is identical to that in FIG. 19 representing the access to area 3 other than areas 0 to 2 except for a difference in the presence or absence of responses of the external input signals.

In the priority control circuit 14, the MEM(0:3) signal is 1'H, and therefore the CNT(0:3) signal is 1'H.

In the external input signal check circuit 15, the CNT(0:3) signal is 1'H, and therefore only NchTG 504 is switched on, with the value of EXT(3) output as the EXTEN signal. The EXT(3) signal is 1'B, so that the EXTEN signal assumes 1'B.

In the single cycle wait control circuit 17, the CNT(0:3) signal is 1'H, turning on the NchTGs 704, 708, 712, 716, 720, and inputting 11111'B (=31 waits) of NW0(3), NW1(3), NW2(3), NW3(3) and NW4(3) as NW(0:4) signals to the comparator (1) 723. With the single cycle wait control circuit 17, during the period when NW(0:4) is larger than COUNT1(0:4), the external DC2# signal is applied to the bus interface control circuit 20 as the single cycle DC signal. When NW(0:4) becomes equal to COUNT1(0:4), on the other hand, the DC signal generated by the DC signal generation circuit (1) 724 is output as the single cycle DC signal to the bus interface control circuit 20. In this access, the memory controller 2 asserts the DC# signal with two waits, and therefore the particular external input signal is output as the single cycle DC signal.

Regarding the burst transfer control circuit 16, the CNT (0:3) signal is 1'H, and therefore only NchTG 604 is turned on, and 0'B of BM(3) bits (without a burst transfer) is applied to the burst mode signal generation circuit 605. The BM(3) signal is input also to the comparator (2) 811 of the burst cycle wait control circuit 18. The burst transfer control circuit 16 outputs the BURST# signal from the external source as the burst mode signal during the time when NW(0:4) is larger than COUNT1(0:4), while outputting the BURST signal generated in the burst mode signal generation circuit 605 as the burst mode signal when NW(0:4) becomes equal to COUNT1(0:4). In the example, since the memory controller 2 asserts the BURST# signal with two waits, this external input signal is output as the burst mode signal.

In the burst cycle wait control circuit 18, the CNT(0:3) signal is 1'H. Therefore, the NchTGs 804, 808 are turned on, and 00'B (with 0 wait) of BW0(3) and BW1(3) bits are impressed to the comparator (2) 811 as the BW(0:1) signal. Since the BM bits of the memory area address register (3) are 0'B and set in a mode without a burst transfer, however, the comparator (2) 812 keeps the CMP2 signal to be 0'B. As a result, the microprocessor 1 operates always with the external DC# signal as the burst cycle DC signal. In the present access, the memory controller 2 sends the DC# signal with one wait, whereby the particular external input signal is used as the burst mode signal.

In the bus error control circuit 19, the CNT(0:3) signal is 1'H. Therefore, only NchTG 904 is turned on, and 1'B of BE(3) bits (with a bus error) is applied to the bus error signal generation circuit 905. During the period when NW(0:4) is larger than COUNT1(0:4), the external BERR# signal is output from the bus error control circuit 19 to the bus interface control circuit 20 as the bus error signal. When NW(0:4) becomes equal to COUNT1(0:4), the bus error signal generated in the bus error signal generation circuit 905 is applied to the bus interface control circuit 20 as the bus error signal. In this case of access, the memory controller 2 returns the DC# signal with two waits, but does not assert the BERR# signal. Therefore, the single cycle is normally completed, with the result that the bus error signal is not asserted.

As explained above, even with the setting similar to that of the memory area address register (3), the system operates in response to the external input signal if set in the external input signal check mode.

3) Access to area 3 without a memory packed, other than areas 0 to 2:

In the case where an address to be accessed is within area 3 other than areas 0 to 2 on the memory space, only the MEM(3) signal is 1'B, so that the inverted MEM(3)# signal (=0'B) produced by the inverter 21 is output at the starting time of access. This address is not included in the areas designated by entries 0 to 2. The MEM(0), MEM(1) and MEM(2) signals are accordingly 0'B, and hence the MEM (0)#, MEM(1)#and MEM(2)# signals assume 1'B. The MEM(0:3)# signal is output at the same time as the BS# signal at the start of access.

This area where a memory is not packaged requires no response from the memory controller 2. Therefore, nothing related to the area is set in the memory controller 2. As a consequence, if the access is made to this area, the system operates simply by setting of the memory area address register (3).

The MEM(0:3) signal is 1'H in the priority control circuit 14, and hence the CNT(0:3) signal is 1'H.

In the external input signal check circuit 15, the CNT(0:3) signal is 1'H. Therefore, only NchTG 504 is turned on, and the value of EXT(3) bits is applied as the EXTEN signal to the burst transfer control circuit 16, the single cycle wait control circuit 17, the burst cycle wait control circuit 18 and the bus error control circuit 19. The value of EXT(3) bits is 1'B, and hence the EXTEN signal alike is 1'B.

In the single cycle wait control circuit 17, the CNT(0:3) signal is 1'H. Therefore, NchTGs 704, 708, 712, 716 and 720 are turned on, so that 11111'B of NW0(3), NW1(3), NW2(3), NW3(3) and NW4(3) bits (with 31 waits) are input as the NW(0:4) signal to the comparator (1) 723. The single cycle wait control circuit 17 outputs the external DC# signal to the bus interface control circuit 20 while NW(0:4) is larger than COUNT1(0:4). When NW(0:4) becomes equal to COUNT1 (0:4), the DC signal generated in the DC signal generation circuit (1) 724 is applied as the single cycle DC signal to the bus interface control circuit 20. In this access, since the memory controller 2 is not set to respond, the DC signal generation circuit (1) 724 outputs the DC signal generated at the 31st wait as the single cycle DC signal.

In the burst transfer control circuit 16, the CNT(0:3) signal is 1'H. Therefore, only NchTG 604 is turned on, and 0'B of BM(3) bits (without a burst transfer) is applied to the burst mode signal generation circuit 605. The BM(3) signal is fed also to the comparator (2) 811 of the burst cycle wait control circuit 18. The burst transfer control circuit 16 outputs the external BURST# signal as the burst mode signal as long as NW(0:4) is larger than COUNT1 (0:4), and outputs the BURST signal generated in the burst mode signal generation circuit 605 as the burst mode signal when NW(0:4) becomes equal to COUNT1(0:4). In this example, the memory area address register is set without a burst transfer, and moreover the memory controller 2 is not set to respond, whereby the burst mode signal is not asserted. In the burst cycle wait control circuit 18, the CNT(0:3) signal is 1'H. Therefore, NchTGs 804 and 808 are turned on, with 00'B (with 0 wait) of BW0(3) and BW1(3) bits applied as the BW(0:1) signal to the comparator (2) 811. In view of the fact that the BM bits of the memory area address register (3) are 0'B and set in the mode without a burst transfer, the CMP2 signal from the comparator (2) 811 is fixed to 0'B. As a result, the microprocessor 1 always operates with employing the external DC# signal as the burst cycle DC signal. Since the memory controller 2 does not respond, the burst cycle DC signal is not asserted.

In the burst error control circuit 19, the CNT(0:3) signal is 1'H. Therefore, only NchTG 904 is turned on, and 1'B of BE(3) bits (with a bus error) is applied to the bus error signal generation circuit 905. The bus error control circuit 19 impresses the external BERR# signal to the bus interface control circuit 20 during the period when NW(0:4) is larger than COUNT1(0:4). When NW(0:4) becomes equal to COUNT1(0:4), the bus error signal generated in the bus error signal generation circuit 905 is output as the bus error signal to the bus interface control circuit 20. Since the memory controller 2 is not required to make a response, the single cycle DC signal is generated at the 31st wait at the DC signal generation circuit (1) 724. When the CMP1 signal is changed to 1'B, the bus error signal generation circuit 905 generates and asserts a bus error signal.

The bus interface control circuit 20 terminates the bus access immediately when receiving the bus error signal, with starting the exception handling for the bus error.

If the whole area of the memory space is set as a bus error area of 31 waits as in the memory area address register (3), the exception handling can be started without any hang-up even when the access is made erroneously to an area without an on-board memory.

The embodiment under consideration is related to the case in which the sets of the memory area address registers and the memory area mask registers have four entries. The number of entries, however, is not limited to four. Even when the number is increased/decreased, a memory area of an arbitrary size can be set at an arbitrary address as in the present embodiment.

Embodiment 2

According to this embodiment, one of the vacant bits (20 to 31 bits) of the memory area mask register of the first embodiment in FIG. 15 is assigned for a wait invalidation bit (fifth bit) which invalidates the bits (NW(0:4) and BW(0:1)) indicating the number of waits. In the case where the wait invalidation bit is valid, the number of waits set in the memory area address register is ignored, and only the DC# signal from the external source is referred to for operation. If the wait invalidation bit is invalid, the operation is proceeded in accordance with the number of waits set in the memory area address register.

An effect similar to that of the present embodiment is obtained even when the wait invalidation bit is assigned to a vacant bit (20th or 21st bit) of the memory area address register shown in FIG. 14.

Although the single cycle wait bit (NW), the burst cycle wait bit (BW), the bus error bit (BE) and the burst transfer mode bit (BM), etc. are assigned to the memory area address register in the foregoing embodiments, an effect similar to that of the present embodiment is obtained when these bits are assigned to the memory area mask register.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes nd bounds thereof are therefore intended to be embraced by the claims.

What is claimed is:

1. A data processing system for accessing a memory via a bus, comprising:

a register means for storing a first bit string of a predetermined number of most significant bits of a head address of a memory area within a predetermined range of said memory, a second bit string where the number of waits for access to said memory area is set, and a third bit string for masking bits from the least significant bit of the predetermined number of the most significant bits of a to-be-accessed address correspondingly to a size of said memory area so as to specify a size of said predetermined range;

a decision circuit including a plurality of first gates each configured to perform an AND operation of respective bits of the predetermined number of bits of said access address and said third bit string in order to mask the predetermined number of bits by said third bit string, a plurality of second gates each configured to decide coincidence between an output of a respective first gate and a corresponding bit of said first string and output a signal corresponding to said coincidence, and a third gate for deciding whether all the coincidence outputs from the plurality of second gates coincide with all the outputs of the plurality of first gates, said decision circuit deciding whether said access address is included in the memory area of said predetermined range; and a bus interface control circuit for controlling the bus access with the number of waits set by said second bit string in the case where the result of decision by said decision circuit indicates that said access address is included in the memory area of said predetermined range.

2. A data processing system according to claim 1, wherein said bus interface control circuit applies a signal showing that said memory area is the target for access to a circuit for decoding the access address in the case where an output of said third gate indicates that all the outputs of said second gate coincide with all the outputs of said first gate.

3. A data processing system according to claim 1, wherein said register stores a fifth bit where a value for invalidating predetermined bits in said register is set.

4. A data processing system to which are applied a first signal indicating the completion of each cycle of a bus access and a second signal indicating the number of waits of the bus access from a memory controller outside the system when accessing a memory via a bus, said system comprising:

a register means for storing a first bit string of a predetermined number of most significant bits of a head address of a memory area in a predetermined range in said memory, a second bit string where the number of waits for access to said memory area is set, a third bit string for masking bits from the least significant bit of the predetermined number of the most significant bits of a to-be-accessed address correspondingly to a size of said memory area so as to specify a size of said predetermined range, and a fourth bit for setting the validity/invalidity of the control of the bus access with reference to the first and second signals from said memory controller when accessing said memory area;

a decision circuit including a plurality of first gates each configured to perform an AND operation of respective bits of the predetermined number of bits of said access address and said third bit string in order to mask the predetermined number of bits by said third bit string, a plurality of second gates each configured to decide coincidence between an output of a respective first gate and a corresponding bit of the first bit string and output a signal corresponding to said coincidence, and a third gate for deciding whether all the coincidence outputs from the plurality of second gates coincide with all the outputs of the plurality of first gates, said decision circuit deciding whether said access address is included in the memory area of said predetermined range; and a bus interface control circuit for controlling the bus access to said memory area in the valid state of said fourth bit by the number of waits indicated by said second signal when said first signal is asserted before a time corresponding to the number of waits set by said second bit string passes, and by the number of waits set by said second bit string when said first signal is not asserted before the time corresponding to the number of waits set by said second bit string passes.

5. A data processing system according to claim 4, wherein said bus interface control circuit applies a signal showing that said memory area is the target for access to a circuit for decoding the access address in the case where an output of said third gate indicates that all the outputs of said second gate coincide with all the outputs of said first gate.

6. A data processing system according to claim 4, wherein said register stores a fifth bit where a value for invalidating predetermined bits in said register is set.

7. A data processing system for accessing a memory via a bus, comprising:

a register means for storing a first bit string of a predetermined number of most significant bits of a head address of a memory area in a predetermined range in said memory, a second bit string where the number of waits for access to said memory area is set, a third bit string for masking bits from the least significant bit of the predetermined number of the most significant bits of a to-be-accessed address correspondingly to a size of said memory area so as to specify a size of said predetermined range, and a fourth bit for setting the validity/invalidity of the activation of a predetermined exception handling when accessing an inaccessible area;

a decision circuit including a plurality of first gates each configured to perform an AND of respective bits of the predetermined number of bits of said access address and the third bit string, a plurality of Second gates each configured to decide coincidence between an output of a respective first gate and a corresponding bit of said first bit string and output a signal corresponding to said coincidence, and a third gate for deciding whether all the coincidence outputs from the plurality of second gates coincide with all the outputs of the plurality of first gates, said decision circuit deciding whether said access address is included in the memory area of said predetermined range; and a bus interface control circuit for starting the predetermined exception handling after a time corresponding to the number of waits set by said second bit string passes when accessing an inaccessible area in the valid state of the fourth bit.

8. A data processing system according to claim 7, wherein said bus interface control circuit applies a signal showing that said memory area is the target for access to a circuit for decoding the access address in the case where an output of said third gate indicates that all the outputs of said second gate coincide with all the outputs of said first gate.

9. A data processing system according to claim 7, wherein said register stores a fifth bit where a value for invalidating predetermined bits in said register is set.

10. A data processing system to which are applied a first signal indicating the completion of each cycle of a bus access, a second signal for indicating the number of waits of the bus access and a third signal for starting a predetermined exception handling when accessing an inaccessible area, from a memory controller outside the system, said system comprising:

a register means for storing a first bit string of a predetermined number of most significant bits of a head address of a memory area in a predetermined range of said memory, a second bit string where the number of waits for access to said memory area is set, a third bit string for masking bits from the least significant bit of the predetermined number of the most significant bits of a to-be-accessed address correspondingly to a size of said memory area so as to specify a size of said predetermined range, a fourth bit for setting the validity/invalidity of the control of the bus access with reference to the first and second signals from said memory controller when accessing said memory area, and a fifth bit for setting the validity/invalidity of the activation of an exception handling when accessing an inaccessible area;

a decision circuit including a plurality of first gates each configured to perform an AND operation of respective bits of the predetermined number of bits of said access address and said third bit string in order to mask the predetermined number of bits by said third bit string, a plurality of second gates each configured to decide coincidence between an output of a respective first gate and a corresponding bit of said first bit string and output a signal corresponding to said coincidence, and a third gate for deciding whether all the coincidence outputs from the plurality of second gates coincide with all the outputs of the plurality of first gates, said decision circuit deciding whether said access address is included in the memory area of said predetermined range; and a bus interface control circuit which operates when said memory area is accessed in the valid state of said fourth and fifth bits in such a manner that said exception handling is started by the number of waits indicated by said second bit string in the case where the first to third signals are asserted before a time corresponding to the number of waits set by said second bit string passes, said bus access is controlled by the number of waits set by said second bit string in the case where the first signal is asserted, but the second signal is not asserted before the time corresponding to the number of waits set by said second bit string passes, said exception handling is started by the number of waits set by said second bit string in the case where the first signal is not asserted before the time corresponding to the number of waits set by said second bit string passes, whereas operating when an inaccessible area is accessed in the valid state of the fifth bit and in the invalid state of the fourth bit in such a manner that the exception handling is started after the time corresponding to the number of waits set by said second bit string passes.

11. A data processing system according to claim 10, wherein said bus interface control circuit applies a signal showing that said memory area is the target for access to a circuit for decoding the access address in the case where an output of said third gate indicates that all the outputs of said second gate coincide with all the outputs of said first gate.

12. A data processing system according to claim 10, wherein said register stores a sixth bit where a value for invalidating predetermined bits in said register is set.

13. A data processing system for accessing a memory via a bus, comprising:

a plurality of memory area control circuits each capable of setting a plurality of memory areas to be controlled by bus access and each provided with a register means for storing a first bit string of a predetermined number of most significant bits of a head address of a memory area within a predetermined range of said memory, a second bit string where the number of waits for access to said memory area is set, and a third bit string for masking bits from the least significant bit of the predetermined number of the most significant bits of a to-be-accessed address correspondingly to a size of said memory area so as to specify a size of said predetermined range and a decision circuit including a plurality of first gates each configured to perform an AND operation of respective bits of the predetermined number of bits of said access address and said third bit string in order to mask the predetermined number of bits by said third bit string, and output a signal corresponding to said coincidence, and a third gate for deciding whether all the coincidence outputs from the plurality of second gates coincide with all the outputs of the plurality of first gates, said decision circuit deciding whether said access address is included in the memory area of said predetermined range;

a circuit for determining the order of priority of a plurality of memory area control circuits and selecting a memory area control circuit of the highest priority in which an output of said third gate indicates the coincidence of all the outputs of said second gate with all the outputs of said first gate;

a selection output circuit for outputting only data of said second bit string of the memory area control circuit selected by said selection circuit; and a bus interface control circuit for controlling the bus access on the basis of data of said second bit string output from said selection output circuit in the case where the memory area to be controlled by said selected memory area control circuit is accessed.

14. A data processing system according to claim 13, wherein said bus interface control circuit applies a signal showing that said memory area is the target for access to a circuit for decoding the access address in the case where an output of said third gate indicates that all the outputs of said second gate coincide with all the outputs of said first gate.

15. A data processing system according to claim 13, wherein said register stores a fourth bit where a value for invalidating predetermined bits in said register is set.

16. A data processing system wherein a first signal indicating the completion of each cycle of a bus access, a second signal for indicating the number of waits of the bus access and a third signal for starting a predetermined exception handling when an inaccessible area is accessed are applied to a processor making access to a memory via a bus; said system comprising:

a plurality of memory area control circuits each capable of setting a plurality of memory areas to be controlled by bus access and each provided with a register means for storing a first bit string of a predetermined number of most significant bits of a head address of a memory area in a predetermined range of said memory, a second bit string where the number of waits for access to said memory area is set, a third bit string for masking bits from the least significant bit of the predetermined number of the most significant bits of a to-be-accessed address correspondingly to a size of said memory area so as to specify a size of said predetermined range, a fourth bit for setting the validity/invalidity of the control of the bus access with reference to the first and second signals from said memory controller when accessing said memory area, and a fifth bit for setting the validity/invalidity of the activation of an exception handling when accessing an inaccessible area and a decision circuit including a plurality of first gates each configured to perform an AND operation of respective bits of the predetermined number of bits of said access address and said third bit string in order to mask the predetermined number of bits by said third bit string, and output a signal corresponding to said coincidence, and a third gate for deciding whether all the coincidence outputs from the plurality of second gates coincide with all the outputs of the plurality of first gates, said decision circuit deciding whether said access address is included in the memory area of said predetermined range;

a circuit for determining the order of priority of a plurality of memory area control circuits and selecting a memory area control circuit of the highest priority in which an output of the third gate indicates the coincidence of all the outputs of the second gate with all the outputs of said first gate;

a selection output circuit for outputting only data of said second bit string and of said fifth bit of the memory area control circuit selected by said selection circuit; and a bus interface control circuit which operates, when the memory area set by said selected memory area control circuit is accessed in the valid state of the fourth and fifth bits in such a manner that said exception handling is started by the number of waits set by said second signal in the case where the first to third signals are asserted before a time corresponding to the number of waits set by said second bit string passes, the bus access is controlled by the number of waits set by said second bit string in the case where the first signal is asserted, but the second signal is not asserted before the time corresponding to the number of waits set by said second bit string passes, said exception handling is started by the number of waits set by said second bit string in the case where the first signal is not asserted before the time corresponding to the number of waits set by said second bit string passes, whereas operating when an inaccessible area is accessed in the valid state of the fifth bit and in the invalid state of the fourth bit in such a manner that the exception handling is started after the time corresponding to the number of waits set by said second bit string passes.

17. A data processing system according to claim 16, wherein said bus interface control circuit applies a signal showing that said memory area is the target for access to a circuit for decoding the access address in the case where an output of said third gate indicates that all the outputs of said second gate coincide with all the outputs of said first gate.

18. A data processing system according to claim 16, wherein said register stores a sixth bit where a value for invalidating predetermined bits in said register is set.

* * * * *